(12) United States Patent
Mei et al.

(10) Patent No.: US 12,047,839 B2
(45) Date of Patent: Jul. 23, 2024

(54) OUT OF BOX USER PERFORMANCE JOURNEY MONITORING

(71) Applicant: Cisco Technology, Inc., San Jose, CA (US)

(72) Inventors: Xiaochun Mei, Palo Alto, CA (US); Tian Bu, Basking Ridge, NJ (US); Swathi Bhat, Redwood City, CA (US); Jia Xu, Tiburon, CA (US); Anupam Jindal, San Francisco, CA (US); Puneet Anand, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 337 days.

(21) Appl. No.: 16/745,648

(22) Filed: Jan. 17, 2020

(65) Prior Publication Data
US 2021/0227351 A1 Jul. 22, 2021

(51) Int. Cl.
| | |
|---|---|
| G06F 11/34 | (2006.01) |
| G01C 21/34 | (2006.01) |
| H04L 67/146 | (2022.01) |
| H04W 4/029 | (2018.01) |
| G06F 11/30 | (2006.01) |

(52) U.S. Cl.
CPC ........ *H04W 4/029* (2018.02); *G01C 21/3446* (2013.01); *G06F 11/3438* (2013.01); *H04L 67/146* (2013.01); *G06F 11/3006* (2013.01)

(58) Field of Classification Search
CPC ...................................................... G06F 11/34
See application file for complete search history.

(56) References Cited

U.S. PATENT DOCUMENTS

| | | | |
|---|---|---|---|
| 6,901,582 B1* | 5/2005 | Harrison | G06F 11/328 |
| | | | 714/39 |
| 9,092,801 B2 | 7/2015 | Chang et al. | |
| 9,554,292 B2* | 1/2017 | Ronen | H04W 4/60 |
| 9,652,797 B2 | 5/2017 | Vijayaraghavan et al. | |
| 9,836,760 B2 | 12/2017 | Greenzeiger et al. | |
| 10,198,340 B2 | 2/2019 | Vesepogu et al. | |
| 10,740,793 B1* | 8/2020 | Sussman | G06Q 30/0255 |
| 2006/0190488 A1* | 8/2006 | Cohen | G06Q 30/02 |
| 2009/0006616 A1 | 1/2009 | Gore et al. | |
| 2017/0068899 A1* | 3/2017 | Laptev | G06N 7/005 |

(Continued)

*Primary Examiner* — Di Xiao
(74) *Attorney, Agent, or Firm* — BEHMKE INNOVATION GROUP LLC; James M. Behmke; James J. Wong

(57) ABSTRACT

In one embodiment, a method for user performance journey monitoring is disclosed. The method illustratively comprises receiving, by a process, user journey information associated with an application and a plurality of application end users, the user journey information indicative of navigation paths of the application end users among a plurality of nodes configured to perform at least a part of the application; receiving, by the process, performance metric information indicative of performance of the plurality of nodes configured to perform at least the part of the application; correlating, by the process, the user journey information with the performance metric information based on one or more query criteria; and storing, by the process, the correlated user journey information and performance metric information in an application end user journey database indexed by the one or more query criteria.

12 Claims, 18 Drawing Sheets

(56) References Cited

U.S. PATENT DOCUMENTS

| | | |
|---|---|---|
| 2018/0123919 A1 | 5/2018 | Naous et al. |
| 2019/0095501 A1 | 3/2019 | Beringer et al. |
| 2019/0123981 A1 | 4/2019 | Johanson et al. |
| 2019/0294718 A1* | 9/2019 | Beringer .............. G06F 16/2465 |
| 2020/0213208 A1* | 7/2020 | Park ...................... H04L 43/045 |
| 2020/0274784 A1* | 8/2020 | Sharma ............... H04L 43/0805 |
| 2021/0302190 A1* | 9/2021 | Miura ................. G01C 21/3608 |
| 2021/0367870 A1* | 11/2021 | Kim .................... H04L 43/0864 |

* cited by examiner

| KEY 804 | FROM 806 | TO 808 | METRICS. DURATION 810 | METRICS. EURT 812 | PAGE EXPERIENCE 814 | CLIENTTIME (TIME VALUE IN MS) 816 | GEO (CITY, REGION, COUNTRY) 818 | BROWSER (BROWSER AND VERSION) 820 | APP KEY 822 |
|---|---|---|---|---|---|---|---|---|---|
| P1:P2 | P1 | P2 | 1000* | 345 | NORMAL | 123456 | US | CHROME 1234 | EUM-123 |
| P2:EXIT | P2 | EXIT | 300000 (5 MINS) | 456 | NORMAL | 124456 | US | CHROME 1234 | EUM-123 |
| P1:P3 | P1 | P3 | 2000* | 4567 | VERY SLOW | 234567 | ASIAN | FIREFOX 123 | EUM-123 |
| P3:EXIT | P3 | EXIT | 300000 (5 MINS) | 567 | NORMAL | 236567 | ASIAN | FIREFOX 123 | EUM-123 |

FIG. 8

| KEY 1204 | TYPE 1206 | VALUE 1208 | CLIENTTIME (TIME VALUE IN MS) 1210 | GEO (CITY, REGION, COUNTRY) 1212 | BROWSER (BROWSER AND VERSION) 1214 | APPKEY 1216 |
|---|---|---|---|---|---|---|
| P1 | N | 1 | 123456 | US | CHROME 1234 | EUM-123 |
| P1:P2 | E0 | 1000 | 123456 | US | CHROME 1234 | EUM-123 |
| P1:P2 | E1 | 345 | 123456 | US | CHROME 1234 | EUM-123 |
| P2 | N | 0 | 124456* | US | CHROME 1234 | EUM-123 |
| P1 | N | 1 | 234567 | ASIAN | FIREFOX 123 | EUM-123 |
| P1:P3 | E0 | 2000 | 234567 | ASIAN | FIREFOX 123 | EUM-123 |
| P1:P3 | E3 | 4567 | 234567 | ASIAN | FIREFOX 123 | EUM-123 |
| P3 | N | 0 | 236567** | ASIAN | FIREFOX 123 | EUM-123 |

FIG. 12

OUT OF BOX USER PERFORMANCE JOURNEY MONITORING

TECHNICAL FIELD

The present disclosure relates generally to computer systems, and, more particularly, to user performance journey monitoring.

BACKGROUND

The Internet and the World Wide Web have enabled the proliferation of web services available for virtually all types of businesses. Due to the accompanying complexity of the infrastructure supporting the web services, including those accessed by traditional web browsers and mobile device applications, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, conventional end user monitoring platforms provide for monitoring of the performance websites and/or mobile applications, and allow operators to set up health rules and alert actions in response to monitored application performance. However, data gathered and monitored by conventional end user monitoring platforms is typically isolated to particular devices, nodes, processes, etc., and do not provide a complete picture of an end user's interaction with a website and/or mobile application.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 8 illustrates example records stored in an event service of a system for user performance journey monitoring;

FIG. 12 illustrates example records stored in an event service of a system for user performance journey monitoring using an alternative schema;

DESCRIPTION OF EXAMPLE EMBODIMENTS

Overview

Figure 1A:
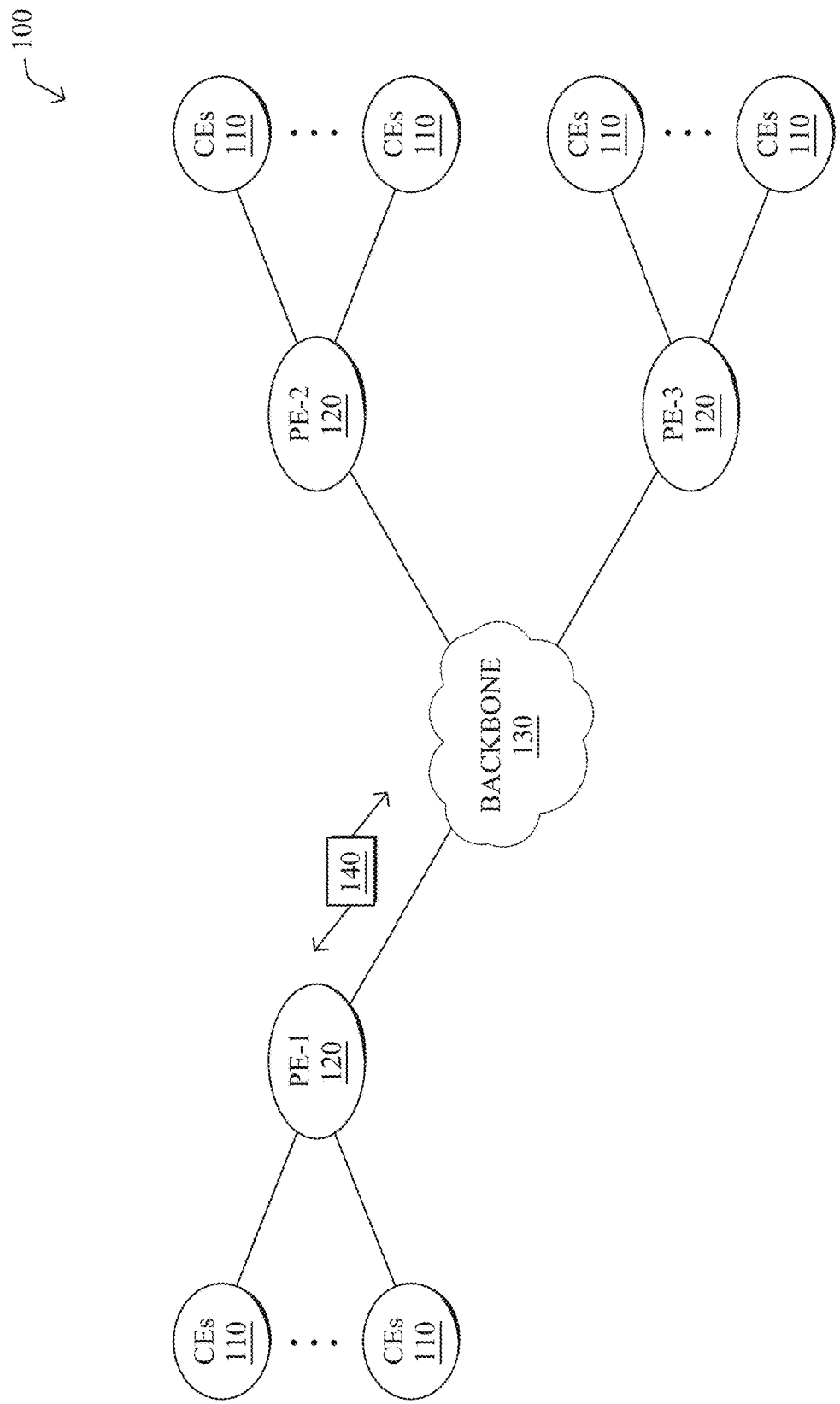
FIGS. 1A-1B illustrate an example computer network.

According to one or more embodiments of the disclosure, "out of box" user performance journey monitoring is shown and described. In particular, in one embodiment, the techniques herein receive user journey information associated with an application and a plurality of application end users, where the user journey information is indicative of navigation paths of the application end users among a plurality of nodes configured to perform at least a part of the application. Once performance metric information indicative of performance of the plurality of nodes configured to perform at least the part of the application is received, the techniques herein may then correlate the user journey information with the performance metric information based on one or more query criteria. As such, the techniques herein may store the correlated user journey information and performance metric information in an application end user journey database indexed by the one or more query criteria.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
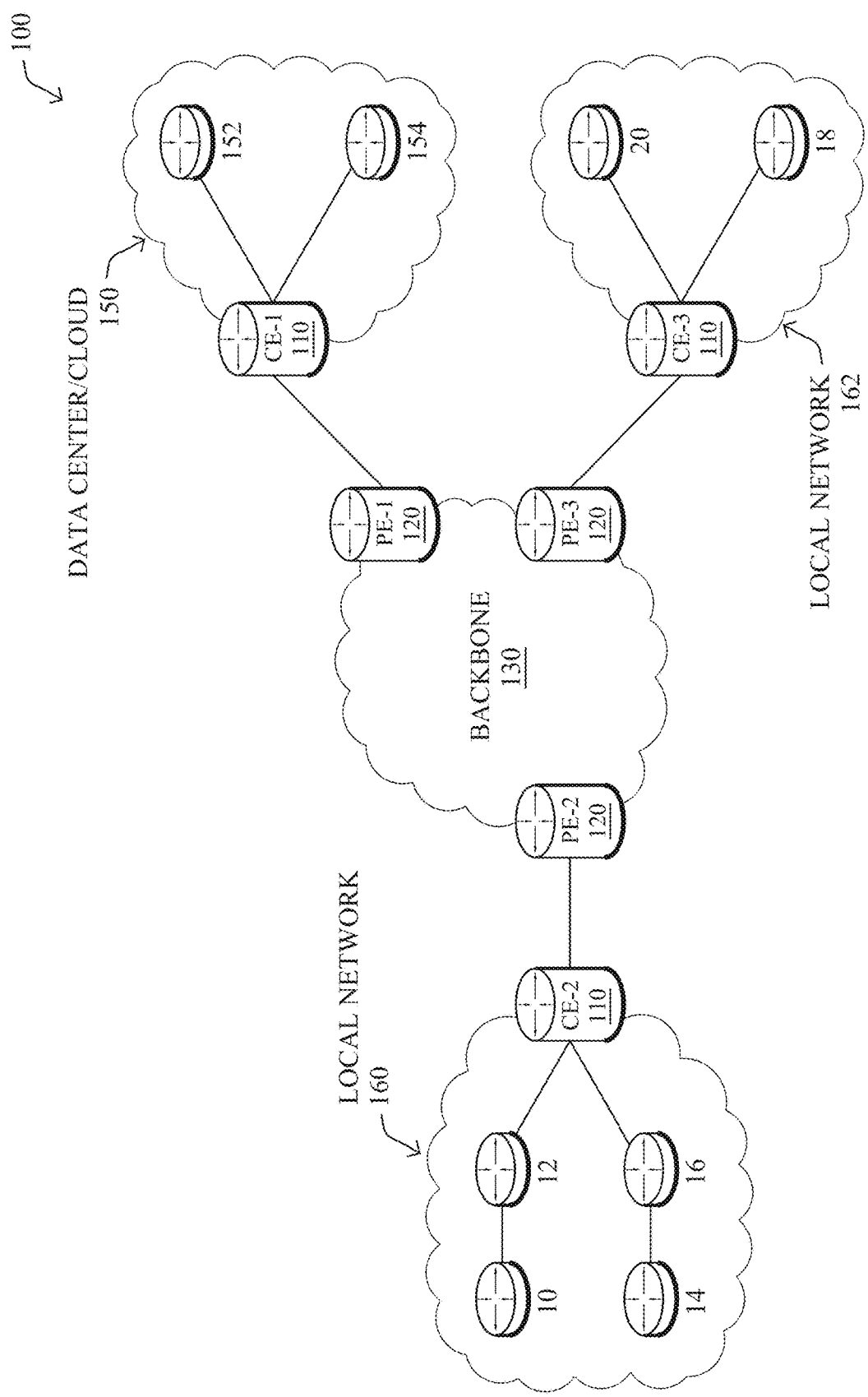

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
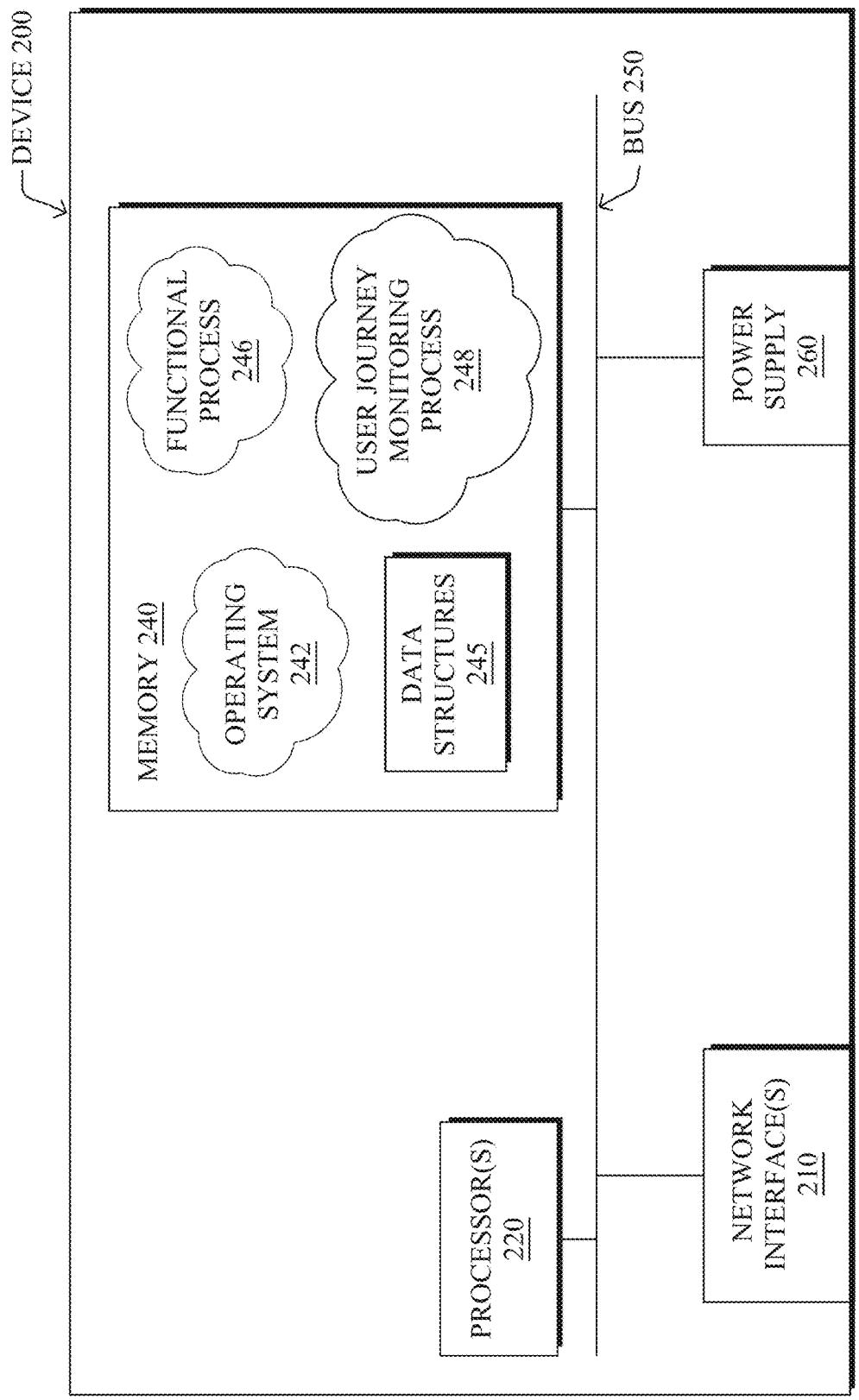
FIG. 2 illustrates an example computing device/node.

FIG. 2 is a schematic block diagram of an example computing device (e.g., apparatus) 200 that may be used with one or more embodiments described herein, e.g., as any of the devices shown in FIGS. 1A-1B above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, wireless transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "user journey monitoring" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Application Intelligence Platform—

The embodiments herein relate to an application intelligence platform for application performance management. In one aspect, as discussed with respect to FIGS. 3-5 below, performance within a networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information). The agent-collected data may then be provided to one or more servers or controllers to analyze the data.

Figure 3:
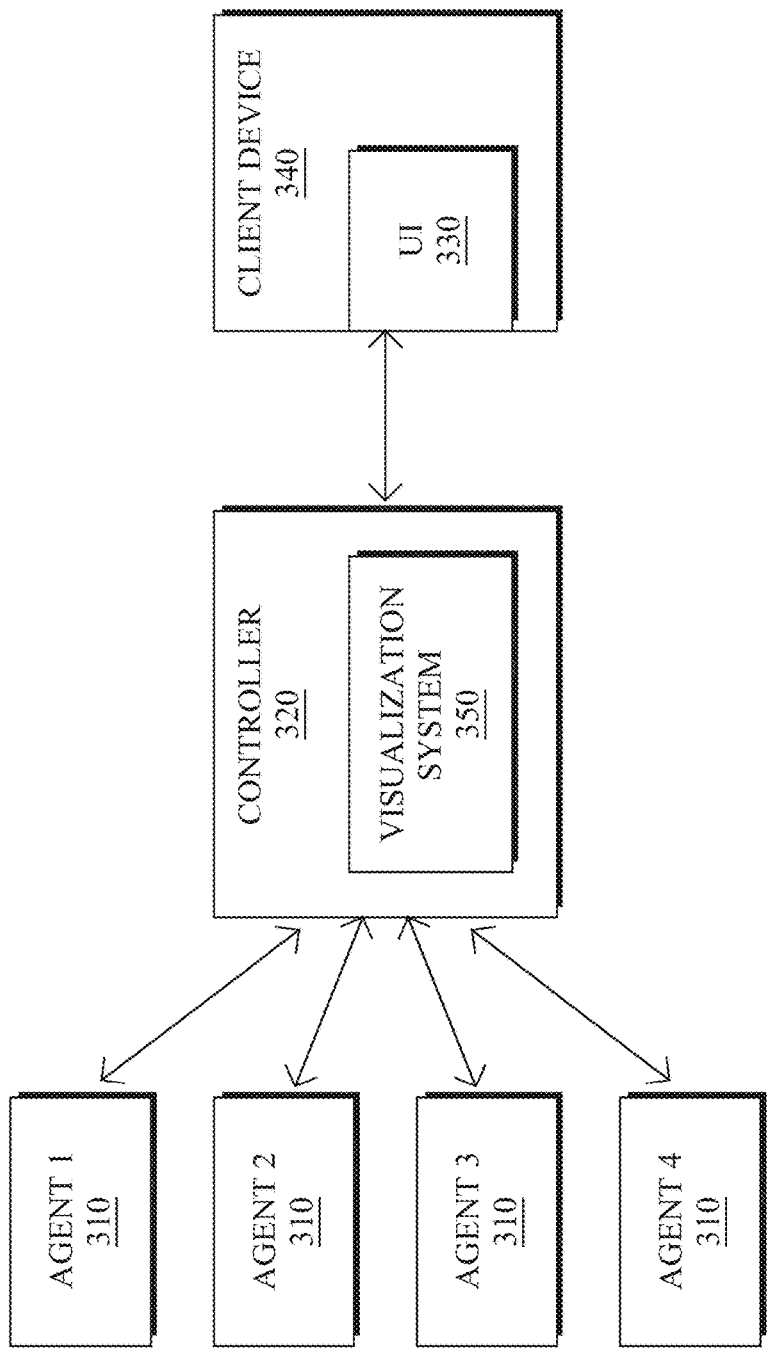
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premises (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
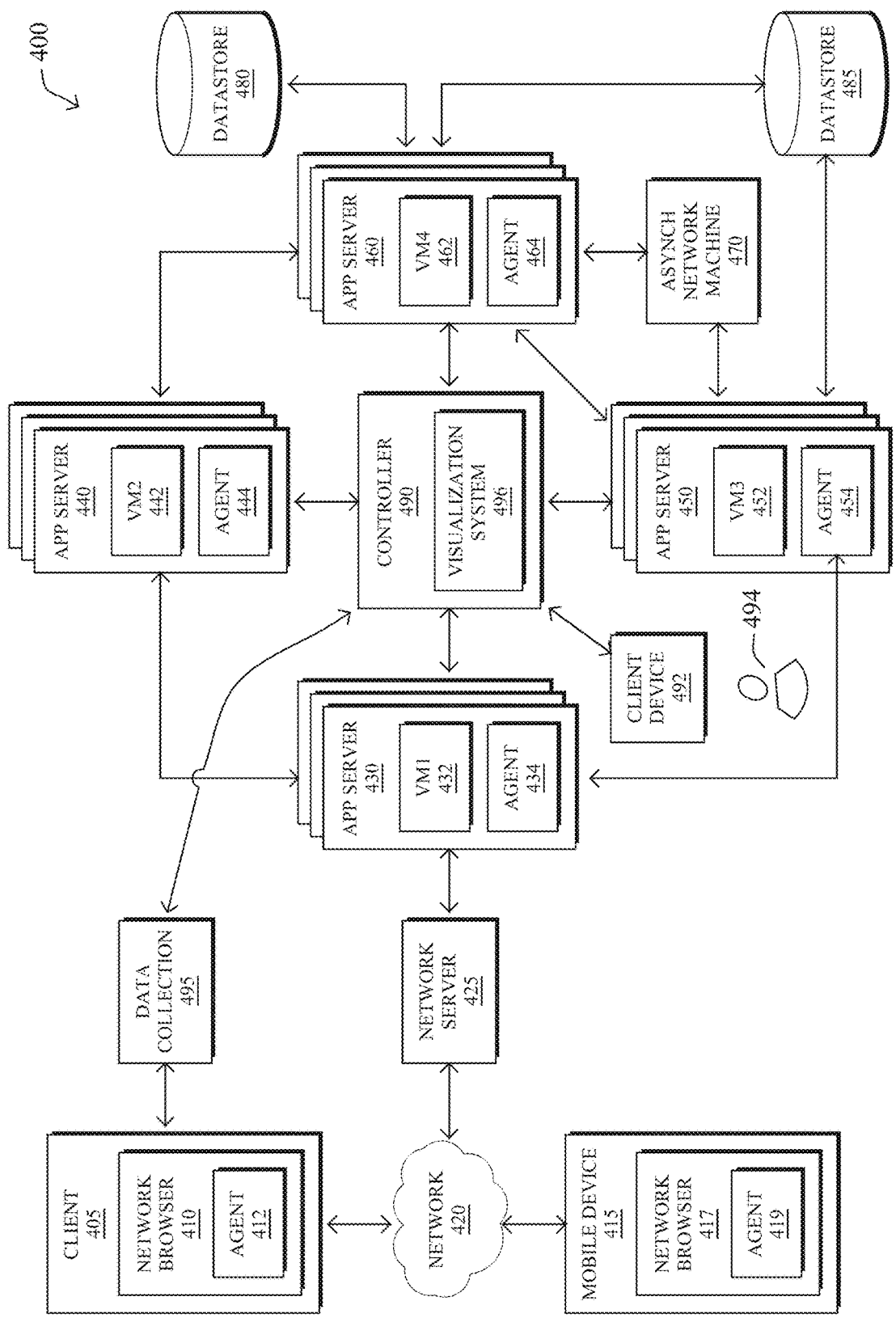
FIG. 4 illustrates an example system for implementing the example application intelligence platform.

FIG. 4 illustrates an example application intelligence platform (system) 400 for performing one or more aspects of the techniques herein. The system 400 in FIG. 4 includes client device 405 and 492, mobile device 415, network 420, network server 425, application servers 430, 440, 450, and 460, asynchronous network machine 470, data stores 480 and 485, controller 490, and data collection server 495. The controller 490 can include visualization system 496 for providing displaying of the report generated for performing the field name recommendations for field extraction as disclosed in the present disclosure. In some implementations, the visualization system 496 can be implemented in a separate machine (e.g., a server) different from the one hosting the controller 490.

Client device 405 may include network browser 410 and be implemented as a computing device, such as for example a laptop, desktop, workstation, or some other computing device. Network browser 410 may be a client application for viewing content provided by an application server, such as application server 430 via network server 425 over network 420.

Network browser 410 may include agent 412. Agent 412 may be installed on network browser 410 and/or client 405 as a network browser add-on, downloading the application to the server, or in some other manner. Agent 412 may be executed to monitor network browser 410, the operating system of client 405, and any other application, API, or another component of client 405. Agent 412 may determine network browser navigation timing metrics, access browser cookies, monitor code, and transmit data to data collection 495, controller 490, or another device. Agent 412 may perform other operations related to monitoring a request or a network at client 405 as discussed herein including report generating.

Mobile device 415 is connected to network 420 and may be implemented as a portable device suitable for sending and receiving content over a network, such as for example a mobile phone, smart phone, tablet computer, or other portable device. Both client device 405 and mobile device 415 may include hardware and/or software configured to access a web service provided by network server 425.

Mobile device 415 may include network browser 417 and an agent 419. Mobile device may also include client applications and other code that may be monitored by agent 419. Agent 419 may reside in and/or communicate with network browser 417, as well as communicate with other applications, an operating system, APIs and other hardware and software on mobile device 415. Agent 419 may have similar functionality as that described herein for agent 412 on client 405, and may report data to data collection server 495 and/or controller 490.

Network 420 may facilitate communication of data among different servers, devices and machines of system 400 (some connections shown with lines to network 420, some not shown). The network may be implemented as a private network, public network, intranet, the Internet, a cellular network, Wi-Fi network, VoIP network, or a combination of one or more of these networks. The network 420 may include one or more machines such as load balance machines and other machines.

Network server 425 is connected to network 420 and may receive and process requests received over network 420. Network server 425 may be implemented as one or more servers implementing a network service, and may be implemented on the same machine as application server 430 or one or more separate machines. When network 420 is the Internet, network server 425 may be implemented as a web server.

Application server 430 communicates with network server 425, application servers 440 and 450, and controller 490. Application server 450 may also communicate with other machines and devices (not illustrated in FIG. 4). Application server 430 may host an application or portions of a distributed application. The host application 432 may be in one of many platforms, such as including a Java, PHP, .Net, and Node.JS, be implemented as a Java virtual machine, or include some other host type. Application server 430 may also include one or more agents 434 (i.e., "modules"), including a language agent, machine agent, and network agent, and other software modules. Application server 430 may be implemented as one server or multiple servers as illustrated in FIG. 4.

Application 432 and other software on application server 430 may be instrumented using byte code insertion, or byte code instrumentation (BCI), to modify the object code of the application or other software. The instrumented object code may include code used to detect calls received by application 432, calls sent by application 432, and communicate with agent 434 during execution of the application. BCI may also be used to monitor one or more sockets of the application and/or application server in order to monitor the socket and capture packets coming over the socket.

In some embodiments, server 430 may include applications and/or code other than a virtual machine. For example, servers 430, 440, 450, and 460 may each include Java code, .Net code, PHP code, Ruby code, C code, C++ or other binary code to implement applications and process requests received from a remote source. References to a virtual machine with respect to an application server are intended to be for exemplary purposes only.

Agents 434 on application server 430 may be installed, downloaded, embedded, or otherwise provided on application server 430. For example, agents 434 may be provided in server 430 by instrumentation of object code, downloading the agents to the server, or in some other manner. Agent 434 may be executed to monitor application server 430, monitor code running in a virtual machine 432 (or other program language, such as a PHP, .Net, or C program), machine resources, network layer data, and communicate with byte instrumented code on application server 430 and one or more applications on application server 430.

Each of agents 434, 444, 454, and 464 may include one or more agents, such as language agents, machine agents, and network agents. A language agent may be a type of agent that is suitable to run on a particular host. Examples of language agents include a Java agent, .Net agent, PHP agent, and other agents. The machine agent may collect data from a particular machine on which it is installed. A network agent may capture network information, such as data collected from a socket.

Agent 434 may detect operations such as receiving calls and sending requests by application server 430, resource usage, and incoming packets. Agent 434 may receive data, process the data, for example by aggregating data into metrics, and transmit the data and/or metrics to controller 490. Agent 434 may perform other operations related to monitoring applications and application server 430 as discussed herein. For example, agent 434 may identify other applications, share business transaction data, aggregate detected runtime data, and other operations.

An agent may operate to monitor a node, tier of nodes, or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agents may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from one or more network interfaces (e.g., so that data generated/received by all the applications using sockets can be intercepted). The network agent may receive flow data from a language agent that is associated with applications to be monitored. For flows in the flow group data that match flow data provided by the language agent, the network agent rolls up the flow data to determine metrics such as TCP throughput, TCP loss, latency, and bandwidth. The network agent may then report the metrics, flow group data, and call chain data to a controller. The network agent may also make system calls at an application server to determine system information, such as for example a host status check, a network status check, socket status, and other information.

A machine agent, which may be referred to as an infrastructure agent, may reside on the host and collect information regarding the machine which implements the host. A machine agent may collect and generate metrics from information such as processor usage, memory usage, and other hardware information.

Each of the language agent, network agent, and machine agent may report data to the controller. Controller 490 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 434 may create a request identifier for a request received by server 430 (for example, a request received by a client 405 or 415 associated with a user or another source). The request identifier may be sent to client 405 or mobile device 415, whichever device sent the request. In embodiments, the request identifier may be created when data is collected and analyzed for a particular business transaction.

Each of application servers 440, 450, and 460 may include an application and agents. Each application may run on the corresponding application server. Each of applications 442, 452, and 462 on application servers 440-460 may operate similarly to application 432 and perform at least a portion of a distributed business transaction. Agents 444, 454, and 464 may monitor applications 442-462, collect and process data at runtime, and communicate with controller 490. The applications 432, 442, 452, and 462 may communicate with each other as part of performing a distributed transaction. Each application may call any application or method of another virtual machine.

Asynchronous network machine 470 may engage in asynchronous communications with one or more application servers, such as application server 450 and 460. For example, application server 450 may transmit several calls or messages to an asynchronous network machine. Rather than communicate back to application server 450, the asynchronous network machine may process the messages and eventually provide a response, such as a processed message, to application server 460. Because there is no return message from the asynchronous network machine to application server 450, the communications among them are asynchronous.

Data stores 480 and 485 may each be accessed by application servers such as application server 460. Data store 485 may also be accessed by application server 450. Each of data stores 480 and 485 may store data, process data, and return queries received from an application server. Each of data stores 480 and 485 may or may not include an agent.

Controller 490 may control and manage monitoring of business transactions distributed over application servers 430-460. In some embodiments, controller 490 may receive application data, including data associated with monitoring client requests at client 405 and mobile device 415, from data collection server 495. In some embodiments, controller 490 may receive application monitoring data and network data from each of agents 412, 419, 434, 444, and 454 (also referred to herein as "application monitoring agents"). Controller 490 may associate portions of business transaction data, communicate with agents to configure collection of data, and provide performance data and reporting through an interface. The interface may be viewed as a web-based interface viewable by client device 492, which may be a mobile device, client device, or any other platform for viewing an interface provided by controller 490. In some embodiments, a client device 492 may directly communicate with controller 490 to view an interface for monitoring data.

Client device 492 may include any computing device, including a mobile device or a client computer such as a desktop, work station or other computing device. Client computer 492 may communicate with controller 490 to create and view a custom interface. In some embodiments, controller 490 provides an interface for creating and viewing the custom interface as a content page, e.g., a web page, which may be provided to and rendered through a network browser application on client device 492.

Applications 432, 442, 452, and 462 may be any of several types of applications. Examples of applications that may implement applications 432-462 include a Java, PHP, .Net, Node.JS, and other applications.

Figure 5:
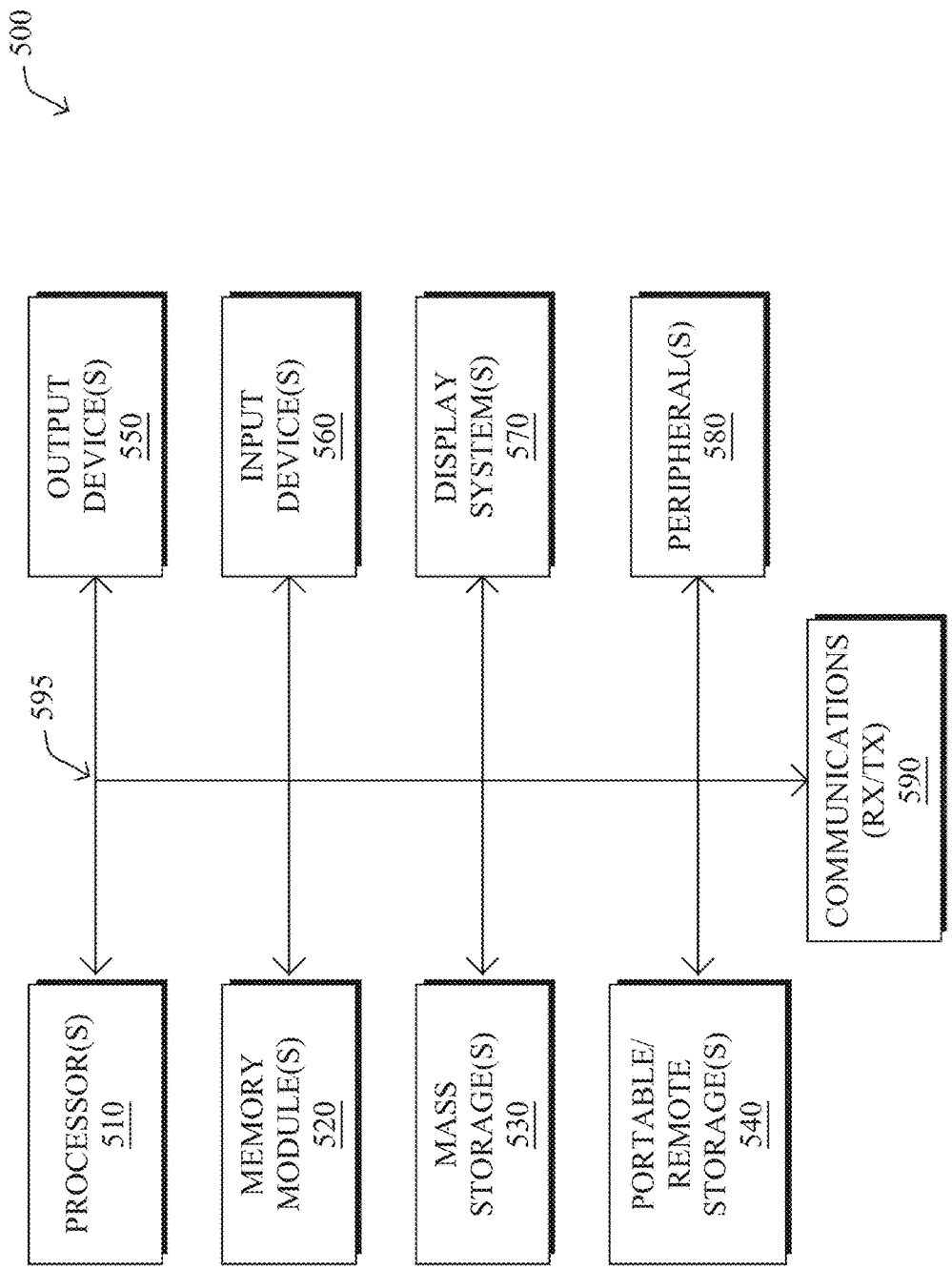
FIG. 5 illustrates an example computing system implementing the disclosed technology.

FIG. 5 is a block diagram of a computer system 500 for implementing the present technology, which is a specific implementation of device 200 of FIG. 2 above. System 500 of FIG. 5 may be implemented in the contexts of the likes of clients 405, 492, network server 425, servers 430, 440, 450, 460, asynchronous network machine 470, and controller 490 of FIG. 4. (Note that the specifically configured system 500 of FIG. 5 and the customized device 200 of FIG. 2 are not meant to be mutually exclusive, and the techniques herein may be performed by any suitably configured computing device.)

The computing system 500 of FIG. 5 includes one or more processors 510 and memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable or remote storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present disclosure for purposes of loading that software into main memory 520.

Portable storage device 540 operates in conjunction with a portable non-volatile storage medium, such as a compact disk, digital video disk, magnetic disk, flash storage, etc. to input and output data and code to and from the computer system 500 of FIG. 5. The system software for implementing embodiments of the present disclosure may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 500 of FIG. 5 may include one or more antennas, radios, and other circuitry for communicating over wireless signals, such as for example communication using Wi-Fi, cellular, or other wireless signals.

—User Performance Journey Monitoring—

In the context of applications, an application intelligence platform as described above (or other application performance monitoring (APM) platforms) may capture business transaction information that reflects (or is indicative of) the way end users of applications use those applications. Notably, an end user journey is a series of steps (or a path) the user may take to accomplish a task on the applications, such as purchasing a book, learning a skill set, or playing a game. These steps may include navigating a web application (e.g., a website like Amazon.com™, Ebay.com™, etc.) or using/playing a mobile application (e.g. a smartphone application like a football league's mobile application, a mobile game, etc.). For operators (e.g., owners, developers, etc.) of the web applications or the mobile application, it is desirable to have simultaneous access to an aggregated view of, firstly, user journeys and, secondly, performance issues (e.g., "glitches" like mobile application crashes, slow webpage downloads, etc.) that may impact behavior of users at certain points in the user journeys. As noted above, conventional end user monitoring platforms, however, only provide for basic monitoring of the performance websites and/or mobile applications, and merely allow operators to set up health rules and alert actions to monitor application performance. That is, data gathered and monitored by the conventional end user monitoring platforms is not indicative of user journey paths.

The techniques herein, on the other hand, provide for user performance journey monitoring that enables operators to simultaneously identify end user journeys and performance issues at points in the journey. In particular, by receiving and storing user journey information in an intermediate data structure, identification of user journeys (e.g., navigation) among nodes of an operator's application may be automatically performed in real-time (e.g., on the order of seconds/minutes from when an end user interacts with an application). In addition, the user journeys, using the intermediate data structure, may be correlated with performance metrics indicative of performance of the operator's application. The performance metrics may be correlated with the user journeys so as to allow operators to quickly and readily identify when a performance issue arises as well as where in the user journeys it occurs. Further, by storing the correlated user journeys and performance metrics in a database that indexes that correlated information by various criteria/parameters (e.g., ad hoc filters like time range, geolocation, browser device type (for web), application version), operators may arbitrarily "slice and dice" the user journey information for end users on the whole or an individual end user in real-time, for example, by the geolocation of end users (e.g., U.S.-based user vs. Asia-based users), browser types of users (e.g., Google Chrome™ vs. Mozilla Firefox™), etc. The operators may also take a holistic view of aggregated, correlated user journeys and performance metrics to identify the most frequently used navigation paths of their applications that users take to perform critical business action (e.g., purchasing an item, enrolling in a service, etc.) and corresponding nodes (of the operators' applications) that perform parts of these critical business actions. Doing so may allow the operators to quickly rectify performance issues that potentially may have significant consequences on the operators' business (e.g., monetary loss, user satisfaction decrease, incomplete click-through, and so on). Additionally, the operators may gain insight on behavior of end users of the applications (e.g., to identify which user journeys (paths) are most "popular", node(s) in a path that are challenging to use, etc.).

Specifically, according to one or more embodiments described herein, the techniques herein illustratively comprise receiving user journey information associated with an application and a plurality of application end users, the user journey information indicative of navigation paths of the application end users among a plurality of nodes configured to perform at least a part of the application The techniques herein then receive performance metric information indicative of performance of the plurality of nodes configured to perform at least the part of the application, and correlate the user journey information with the performance metric information based on one or more query criteria. The techniques herein may then store the correlated user journey information and performance metric information in an application end user journey database indexed by the one or more query criteria.

Figure 6:
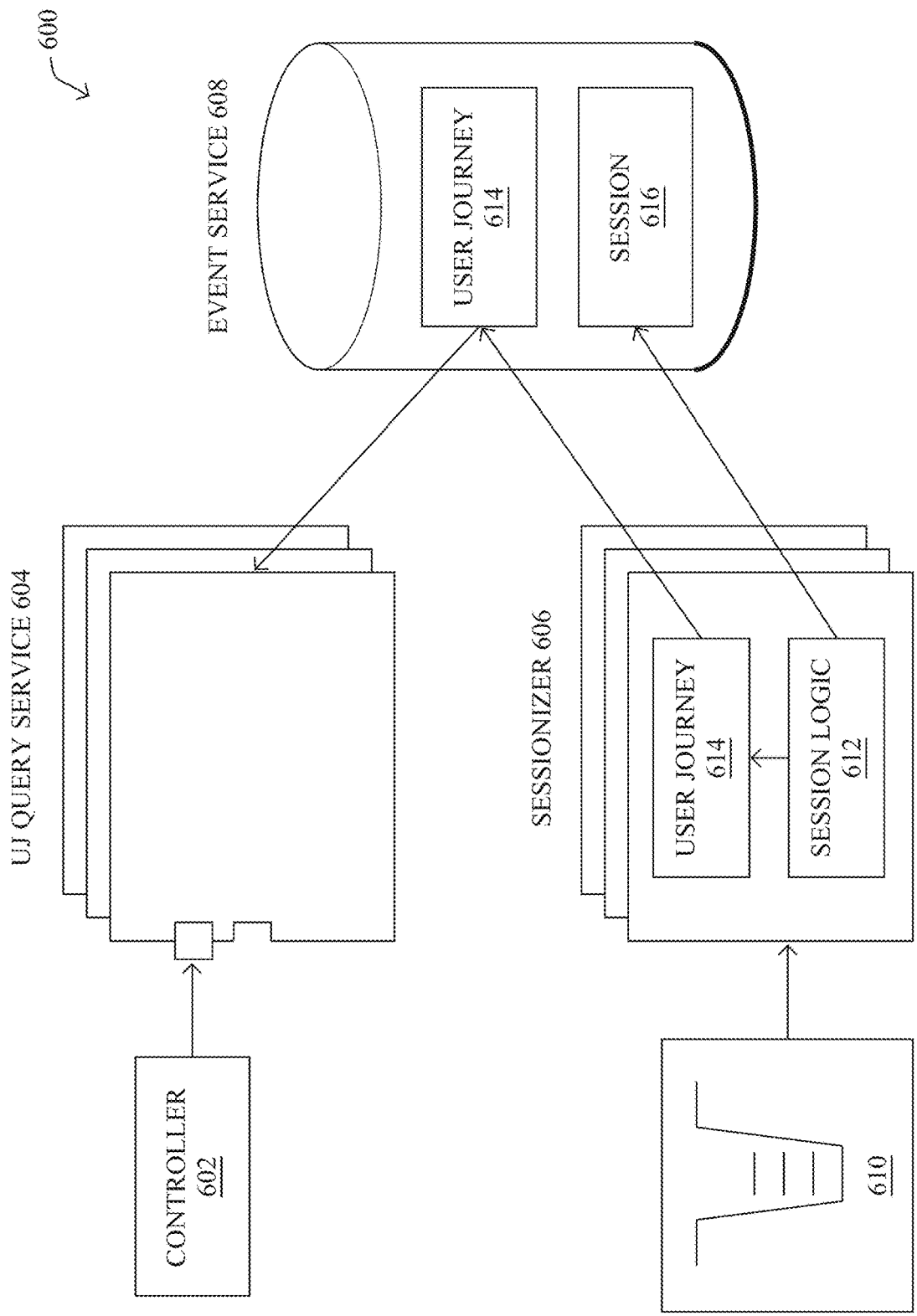
FIG. 6 illustrates an example system for user performance journey monitoring.

Operationally, and with reference now to FIG. 6, an example system 600 for user performance journey monitoring is shown. Notably the system 600 may comprise a controller 602, a user journey (UJ) query service 604, a sessionizer (or user generator) 606, and an event service 608. Each of these components may be part of, or executed by, one or more agents described above herein. Broadly, the sessionizer 606 is configured to receive data from agents operating on one or more monitored (operators) applications 610 and, using session logic 612, to generate user journey data 614 associated with the one or more monitored applications 610. The UJ query service 604 is configured to allow an operator, via a user interface provided by the controller 602, to query for aggregated user journey information that is correlated with performance metrics in real-time (when the generated user journey data 614 gathered by the sessionizer 606 as well as sessions 616 identified by the sessionizer 606 are stored at the event service 608).

With more detail regarding the sessionizer 606, agents, as described above, may be installed on a mobile device, client device, servers which host applications, databases, and other machines or processes. Next, a start of a session (or beginning of a user journey by an end user of an application) may be detected. In particular, a session start may be triggered by the selection to load a content page in a provided by web service being monitored. The session may also be started in different ways, such as clicking a particular page provided by web service. Data is collected for the session by the agents. The agents may monitor the application, machine, and network, as well as user activity. The data collected by the agents is stored, rolled up into metrics, and eventually reported to the sessionizer 606. The data collected and reported may include raw data collected by the agents, metrics generated from the data, and other data such as for example images or video of content pages provided to a user through a content browser. The reported data may include a session identifier to enable subsequent correlation of the data by the session logic 612. The session identifier may be generated by an agent at content browser, an agent processing a request as part of a session, or some other entity. The data may be reported periodically, in response to an event with the agent, or by a request of the controller.

Additionally, an end of the session (or ending of a user journey by an end user of an application) may be detected by the agents. The end of the session may be determined by a user indication, the completion of a particular business transaction, a period of inactivity detected at the network browser associated with the session, or some other reason. The agents may report the end of the session to the to the sessionizer 608. The sessionizer 608 may receive user journey data 614 associated with the session from multiple agents. The sessionizer 608 may, using the session logic 612, then correlate the data using the session identifier that is associated with each piece of data received to generate use journey data 614. Correlation may include stitching together each page view in the order it occurred for the user, and organizing the resources, calls, requests, user activity, and other events in the order they were utilized for each page view. Further, the sessionizer 608 may report (or send) session data 616 to the event service 608.

With more detail regarding the user journey data 614, the sessionizer 606 may generate user journey data, based on incoming events, into an intermediate data structure that can be easily queried by a search engine to generate and identify aggregated or individualized user journeys (e.g., associated with a particular end user, associated with a particular node, etc.). Notably, the search engine (e.g., ElasticSearch by Elastic NV of Mountain View, CA) may be configured to use the intermediate data structure to support aggregation queries and can return results of aggregation query in a timely fashion (e.g., in less than a few seconds). As an example, the search engine may be used as an intermediate data structure that supports an aggregation query in SQL terms such as:

select field1, function(field*) from table where field**= .
. . group by field1 function: sum, count, min, max, etc.

Generally, the intermediate data structure may be used to store three sets of information: 1) user journey edge information (a user data edge has information of end user's navigation from one node to another node, where a node for a web application is a page name and for a mobile application is the mobile applications screen name, for example, UI activity); 2) performance metrics associated to the edge (e.g., duration for end user to navigate from one node to another, "normal" or "slow" performance user experienced, etc.); and 3) criteria (e.g., metadata information) used for queries (e.g., information could be the time when an navigation event happens, the geo information of the user, the browser that user used, etc.).

Further, the session logic 612 may be configured to keep track of state data of edges between nodes that are performing parts of the one or more monitored applications 610 (and send identified sessions 616 to the event service 608). In the case where the one or more monitored applications 610 comprise a web application, the session logic 612 may track end user response time (EURT) (e.g., as a long data type that takes 8 bytes of memory), a duration of the edge (e.g., as a long data type that takes 8 bytes of memory), a page experience in terms of % normal, % slow, % very slow, % stall (e.g., as an enum data type that takes 8 bytes of memory), a number of JavaScript errors (e.g., as a short data type that takes 2 bytes of memory), and a number of Ajax errors (e.g., as a short data type that takes 2 bytes of memory). In the case where the one or more monitored applications 610 comprise a mobile application, the session logic 612 may track a duration of the edge (e.g., as a long data type that takes 8 bytes of memory), a network request (NR) response time (e.g., as a long data type that takes 8 bytes of memory), a NR experience in terms of % normal, % slow, % very slow, % stall (e.g., as an enum data type that takes 8 bytes of memory), a number of crashes (e.g., as a short data type that takes 2 bytes of memory), a number of application not respondings (ANRs) (e.g., as a short data type that takes 2 bytes of memory), and a number of errors (e.g., as a short data type that takes 2 bytes of memory).

Figure 7:
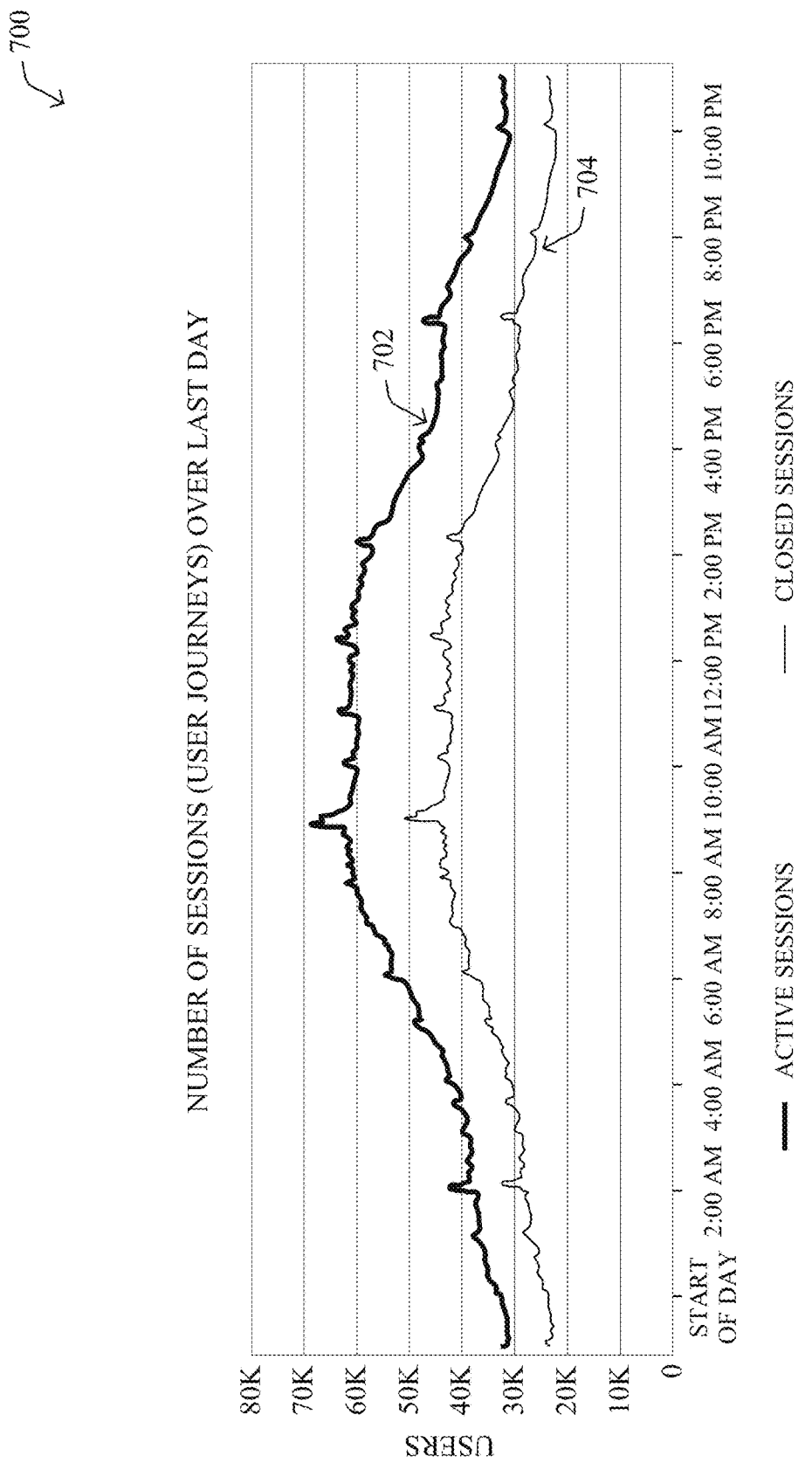
FIG. 7 illustrates an example graph that displays a total number of active sessions and closed sessions across time.

Using the information gathered and generated to monitor the states of edges, a user may determine and monitor sessions (or user journeys) being performed by the one or more monitored applications 610 for corresponding end users. As shown in FIG. 7, a graph 700 may be output to a user interface that displays a total number of active sessions 702 and closed sessions 704 across time. For example, as shown, the max total number of sessions is 110,000 sessions (70,000 active and 40,000 closed), which leads to a total number of memory required for the sessionizer 606 to be approximately 11 megabytes (MB).

With reference again to FIG. 6 and the intermediate data structure used to generate the user journey data 614 that is stored by the event service 608, the intermediate data structure may be extendable so as to handle future requirements of new data attributes. For web applications, the data structure may store in a database a) user journey information (e.g., impact metrics) such as number of users (sessions), a percentage of users, and a median duration, b) performance metrics such as page experience (in terms of % normal, % slow, % very slow, % stall), a EURT median, and error rate: AJAX and Javascript, and c) criteria (e.g., filter fields) such as geolocations, browser types, and browser versions). For web applications, the data structure may store in a database a) user journey information (e.g. impact metrics) such as number of users (sessions), a percentage of users, and a median duration, b) performance metrics such as network request experience (in terms of % normal, % slow, % very slow, % stall), an EURT median, a crash rate, an ANR rate, and an Error rate, and c) criteria (e.g., filter fields) such as a geolocation, application version, a device type, a connection type, carrier type, and web browser type.

Generally, it is to be understood that the more data gathered and monitored by the sessionizer 606 the better, as a larger data set allows a more accurate detection of "popular" points in the one or more monitored applications 610. Further, by decoupling user journey generation from user journey querying (provided by the user journey query service 604), the user journey generation (e.g., using a specific intermediate data structure) may be replaced with another data generation implementation (e.g., for a new type of webservice or interface enabled by the one or more monitored applications 610).

The event service 608 of FIG. 6 may be configured to implement a schema that supports operator querying with different conditions. As an example, an operator may want to compare user journeys for end users in various geographic regions for different releases of their mobile applications (e.g., mobile application version) of their mobile application. Further, an operator may desire assess user journey information based on various time ranges (last one hour, last one day, etc.). To facilitate "slicing and dicing" and fast querying/return of search results of the user journey data 614, the event service 608 may be configured to not store final, calculated user journeys under particular conditions (e.g., geolocation, application etc.), as the combinations of these conditions are essentially infinite. In an embodiment, a search engine that is configured to use the intermediate data structure described above may be used to provide a search function as well as an aggregation function (to search through the user journey data 614 with queries like "give me the total number/sum of records in a certain condition").

For each user journey entry in the database of the event service 608, the schema may dictate that information storage for:

a node includes: 1) a name: unique identifier of a node in a user journey and 2) an indication of first node versus the rest (e.g., a first node for a web application represents a landing page for customer to navigate a user journey diagram and for a mobile application, it typically is the application activity starting point);

an edge includes: 1) a name that uniquely identify an edge, 2) a from node: the name of the starting node of this edge, and 3) a to node: the ending node name of the edge, and various performance metrics for the edge; and filter fields that allow operators to "slice and dice" the user journey data 614, for the node and the edge (e.g., the filter fields may be queried on by operators like an application key or client time that supports querying user journeys on time ranges).

Other considerations for the schema may include a requirement that website application and mobile application user journeys are stored as separate event service 608 event types. Doing so may avoid a noisy neighbor effect (e.g., a search engine store throttles event publishing if publisher reached to the daily storage limit). Further, website applications and mobile applications typically may include different search fields and performance metrics. Another consideration for the schema would be for the event service 608 to only store edge records in a data store ES because the edge already has information on the node (i.e., based on its From and To node data, node metrics may be reconstructed and an edge may be marked as entry edge to allow the UJ query service 604 to identify entry node(s)). One other consideration is for the event service 608 to store all performance metrics into a single edge record to save storage cost.

In an example embodiment, the schema may comprise:
1) common fields for both website application and mobile application user journeys:
   a) key (A unique identifier for a node and edge. For node, a key value is just the name of a node. For edge, a value should contain the information of both starting node and ending node of an edge. For example, a value could be like "node1:node2", assuming ":" could not be part of a node name),
   b) from:,
   c) to:,
   d) isentry:,
   e) clienttime (A long value that represents the timestamp of an edge. An edge's timestamp is equal to its "from" node's timestamp. For a website application, a node is a page download event. For a mobile application, a node is an user interface activity.),
   f) geocity,
   g) geocountry, and
   h) georegion;
2) web application user journey specific fields to track web specific performance metrics and search fields:
   a) pageexperience,
   b) metrics,
   c) duration,
   d) EURT,
   e) JavaScript errors,
   f) Ajaxerrors,
   g) browser type, and
   h) browser version; and
3) mobile application user journey specific fields:
   a) performance metrics such as (duration similar to the website application UJ, crash rate, ANR, error rate),
   b) network requests (such as experience and EURT),
   c) carrier,
   d) connectiontype,
   e) devicename,
   f) devicemanufacturer,
   g) devicemodel,
   h) osversion,
   i) platform,
   j) mobileappname, and
   k) mobileappversion.

Turning now to FIG. 8, example table 800 of records stored in the event service 608 are shown. Notably each record 802 may comprise data points key 804, from 806, to 808, duration 810, EURT 812, pageexperience 814, clienttime 816, geolocation 818, browser type and version 820, and appkey 822. As shown, for instance, a duration for P1:P2 is the P2's client time–P1's client time for user 1. Further, the duration for P1:P3 is P3's client time–P1's client time for user 2.

To minimize the number of queries required to aggregate performance metrics associated with a particular user journey, nested aggregation queries may be used. For example, a sample query may be:

```
{
    "aggs" : {
        "edgename": {
            "terms": {
                "field": "key"
            }
        },
        "aggs": {
            "duration": {
                "stats": {
                    "field": "metrics.duration"
                }
            }
        },
        "eurt" : {
            "stats": {
                "field": "metrics.eurt"
            }
        }
    }
}
}
}
}
```
And a sample response to the query may be:
```
"aggregations": {
    "edgename": {
        "doc_count_error_upper_bound": 0,
        "sum_other_doc_count": 0,
        "buckets": [
            {
                "key": "p1:p2",
                "doc_count": 1,
                "duration": {
                    "value": 1000
                },
                "eurt": {
                    "value": 345
                }
            },
            {
                "key": "p1:p3",
                "doc_count": 1,
                "duration": {
                    "value": 2000
                },
                "eurt": {
                    "value": 4567
                }
            },
            {
                "key": "p2:EXIT",
                "doc_count": 1,
                "duration": {
                    "value": 300000
                },
                "eurt": {
                    "value": 456
                }
            },
            {
                "key": "p3:EXIT",
                "doc_count": 1,
                "duration": {
                    "value": 300000
                },
                "eurt": {
                    "value": 567
                }
            }
        ]
    }
}
```

Figure 9:
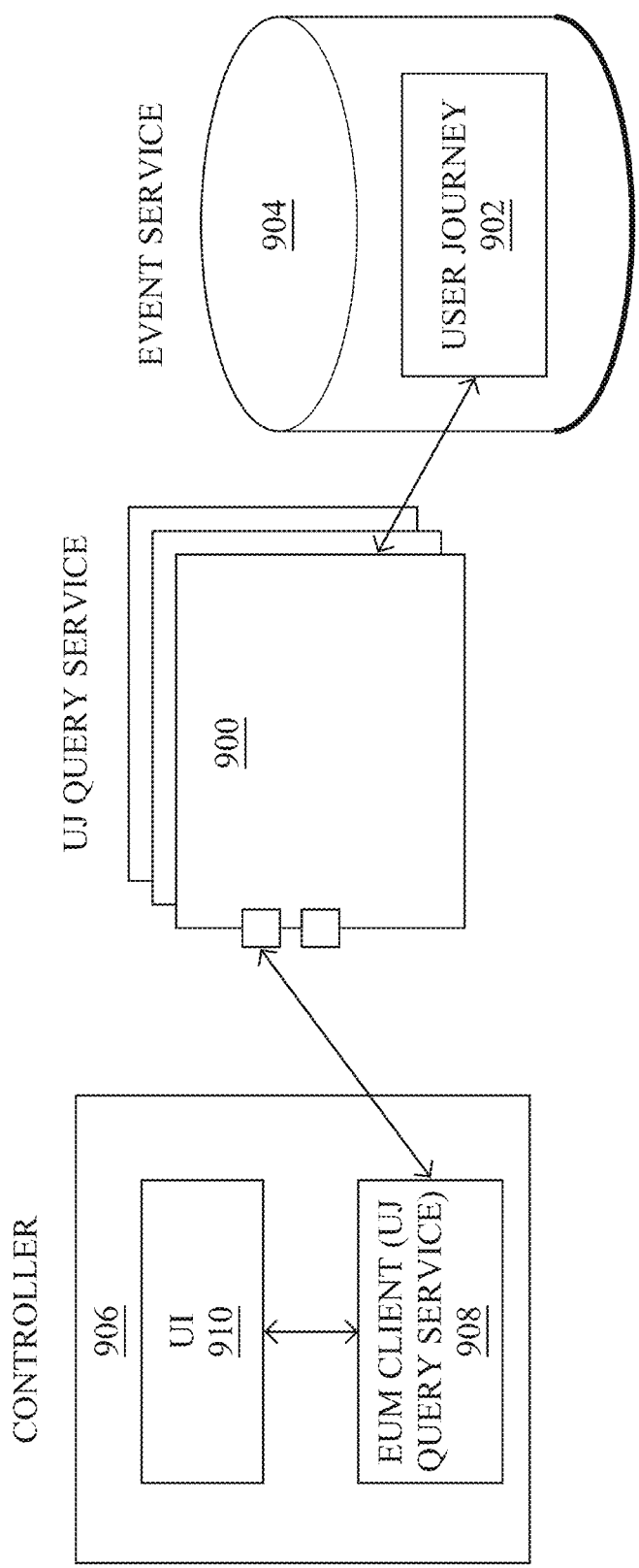
FIG. 9 illustrates an example user journey query service.

With reference now to FIG. 9, more detail regarding a user journey query service 900 is shown. Notably the user journey query service 900 may attempt to access user journey data 902 stored in an event service 904 (implementing the above-described schema) via a controller 906 that is providing an end user monitoring service 904 via a user interface 904. The user journey query service 900 may provide REST APIs for the controller 906 to query user performance journey for a particular monitored application, is for example, a specific time range, geolocation, etc. The API may allow operators to query specific user journeys based on various filter conditions so that the operator may narrow down user journeys for various criteria like a particular mobile application version, a specific browser, and its version. Broadly, the user journey query service 900 may perform quick aggregation queries against the intermediate data store, calculate user journey based on the query result, and return the final user journey with performance data back to the client. The user journey query service 900 may be protected by authentication (for example, using account names and licenses keys).

A request body for the REST APIs may require the following conditions:
eum appkey,
a time range,
a trim filter (when a user diagram is too complicated with many nodes or edges, customer could add trim condition to trim the diagram. Trim condition could be node/edge's occurrences reach to an absolute value, or a percentage over the total number of sessions), and
a conditional filter based on EUM record fields (for mobile applications, this could be App Version, Device, Connection Type, Carrier, GE and for web applications, this could be Browser type and version, GEO).

Further, a response body for the REST APIs may me indicative user journey performance, and may include:
Node[ ] (name, isEntryNode, QoS[ ]),
Edge[ ] (from node's name, to node, QoS[ ]), and
QoS: performance metrics (examples of QoS include but are not limited to name and value value).

The response body may have a list of nodes and edges for a given user journey. Each node represents a node on a user journey graph (for web, it could be a page and for mobile, it could be an end user activity/action). Each node has a name and a list of QoS, where the QoS are indicative of the performance metrics on the node. An example of this QoS is count, which indicate how many users visited the number for the particular period of time that user queries on. Each edge represents a transition from a node to another node. This represents user navigation from page to page (for web applications) or application page to page (for mobile applications). It has three things: the name of the from node of this edge, the name of the node, and a list of QoS representing performance metrics associated with this edge.

The user interface 904 may facilitate various functions such as allowing an operator to specify a time range for a user journey, allowing an operator to "zoom in/out" a user journey, or allowing an operator to specify filters to narrow down user journey for a specific scope (e.g., a certain mobile app version, device, carrier, connection type, etc.).

Figure 10:
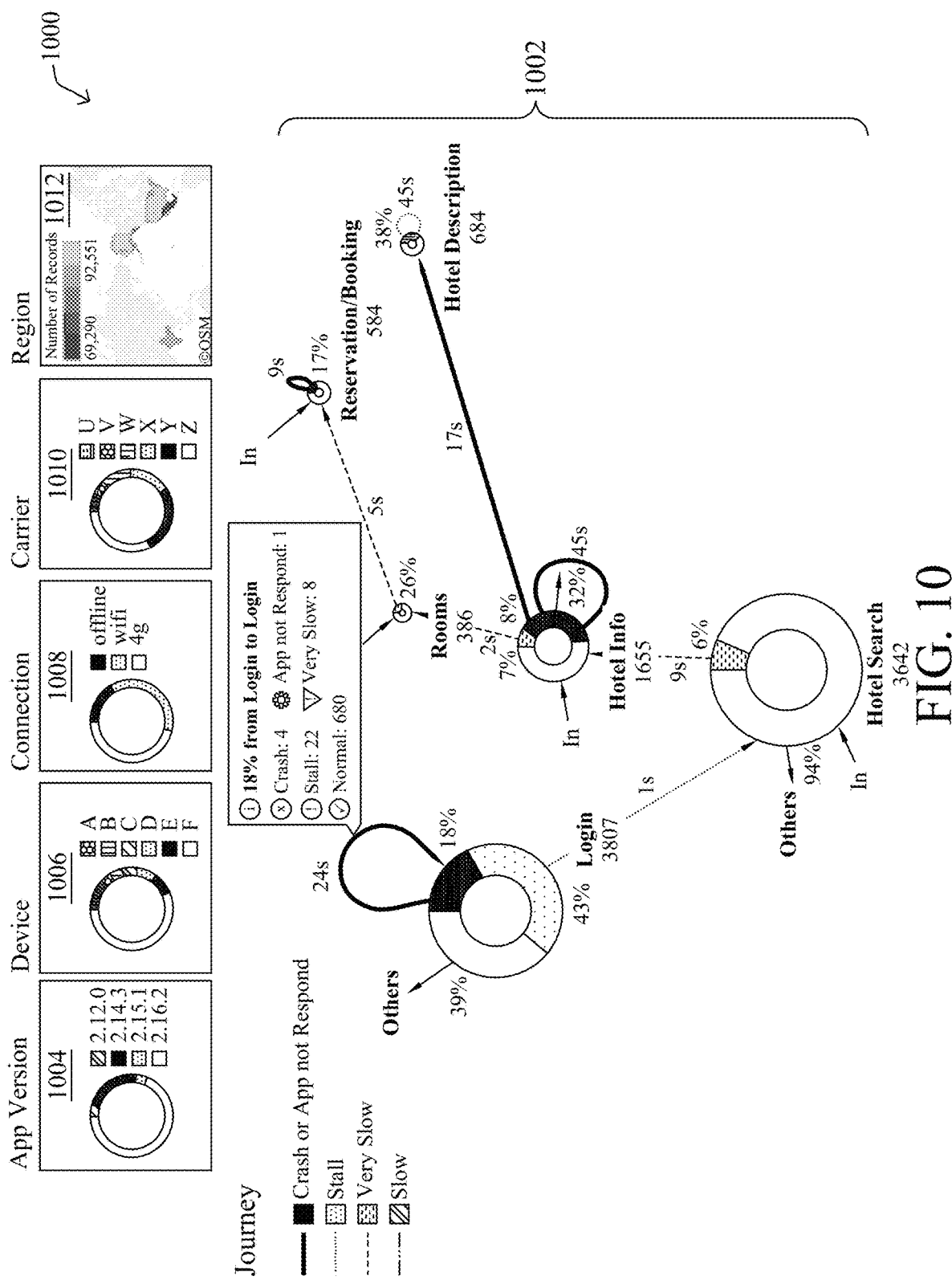
FIG. 10 illustrates an example user interface of a system for user performance journey monitoring.

FIG. 10 depicts an example user interface 1000 that may be generated using the queries for the REST APIs, where various navigation paths are shown 1002, along with statistics regarding application versions 1004, device types 1006, connection types 1008, carrier types 1010, and regions of end users 1012. (In the example shown, for instance, navigation paths 1002 are based on users' journeys through pages for logging in, searching for a hotel, receiving hotel information, and then either finding rooms and reserving/booking the rooms, or else receiving further hotel description. Other use cases may be embodied, and the hotel example is not meant to be limiting to the scope of the present disclosure.)

Figure 11A:
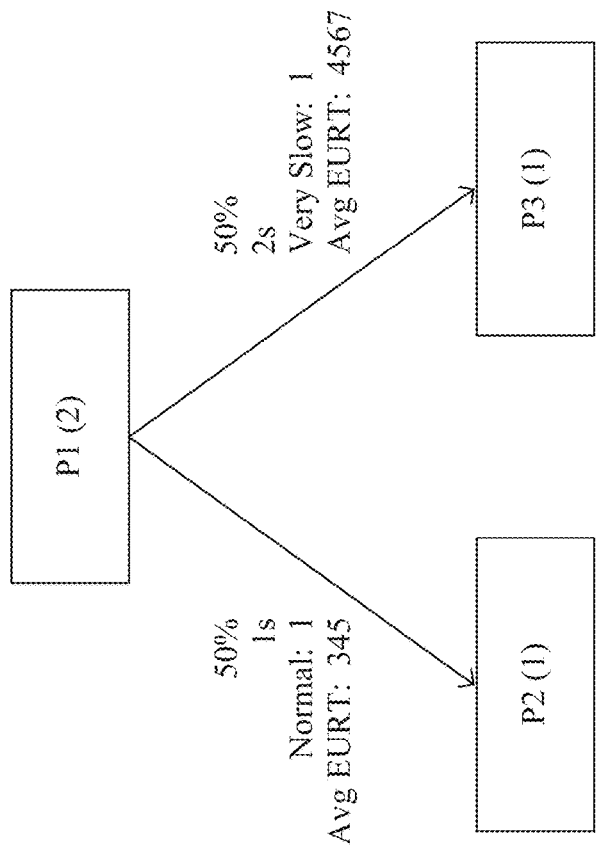
FIGS. 11A-11C illustrate example navigation paths generated from records indicative of user journeys.
Figure 11C:
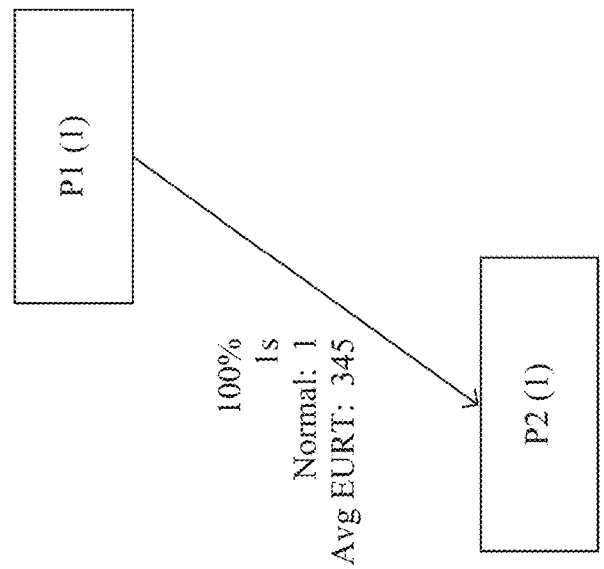
Figure 11B:
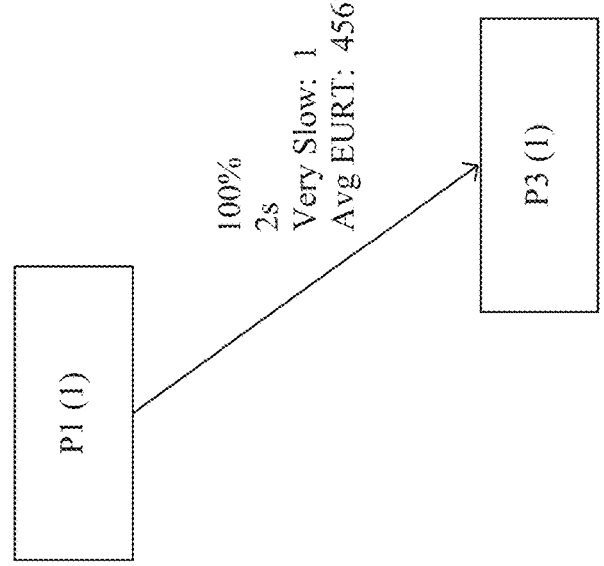

With reference to FIGS. 11A-11C, example navigation paths 1102-1104 generated from the example records 800 are shown. Notably, FIG. 11A depicts aggregated user journey information 1102 that corresponds to all of the example records. FIG. 11B depicts a particular user's journey 1104 from P1 to P3. And FIG. 11C depicts another user's journey 1106 from P1 to P2.

It is to be understood that alternative schema designs may be implemented by the event service. Notably four fields may be used to store all information regarding user journeys among nodes and edges:

1) Key: unique identifier for a node and edge. For node, a key value is just the name of a node. For edge, a value should contain the information of both starting node and ending node of an edge. For example, a value could be like "node1:node2", assuming ":" could not be part of a node name.
2) Type: this indicates which type of a record it is, to interpret the value of a record you have to know what record's type is. Details are below:
   a. N: it is a node record
   b. E #: it is an edge record. #: a number. Different value represents different QoS.
      i. Web
         1. E0: edge, duration
         2. E1: edge, normal
         3. E2: edge, slow
         4. E3: edge, very slow
         5. E4: edge, stall
         6. E5: edge, error of Javascript
         7. E6: edge, error of Ajax
      8. Mobile
         9. E0: edge, duration
         10. E1: edge, normal
         11. E2: edge, slow
         12. E3: edge, very slow
         13. E4: edge, stall
         14. E5: edge, crash
         15. E6: edge, anr
         16. E7: edge, error
3) Value: represent the value of a node or QoS
   a. Node: 1 represents if this is a first node of a UJ that we detect, 0 represents any other node
   b. Edge: represents value for an edge's QoS
      i. Web
         1. E0: long value in milliseconds of a duration of an edge
         2. E1: 1 (number of normal experiences of a Page)
         3. E2: 1 (number of slow experiences of a Page)
         4. E3: 1 (number of very slow experience of a Page)
         5. E4: 1 (number of stall experience of a Page)
         6. E5: a value represent how many Javascript errors happen to an edge for one activity. Typically this should be 1.
         7. E6: a value representing how many AJAX errors happen to an edge for one activity. This could be 1 to many.
      ii. Mobile
         1. E0: long value in milliseconds of a duration of an edge
         2. E1: edge, normal
         3. E2: edge, slow
         4. E3: edge, very slow
         5. E4: edge, stall
         6. E5: edge, crash
         7. E6: edge, anr
         8. E7: edge, error 4) ClientTime: a long value representing the timestamp where an node event happens. For edge, this is the time that this edge's from node's timestamp.

FIG. 12 depicts example records 1200 according to this alternative schema. Notably, records 1202 may each comprise data points key 1204, type 1206, value 1208, clienttime 1210, geolocation 1212, browser 1214, and appkey 1216. As shown, for example, for a web application, two user may perform the following steps when interacting with the web application:

a) user 1 in the US visits page P1, experiences "Normal" performance (EURT 345), stayed there for 1 second (1000 ms), then visits P2; and
b) user 2 in an Asian country visits page P1, experiences "Slow" performance (EURT 4567), stayed there for 2 seconds (2000 ms), then visited P3.

Figure 13A:
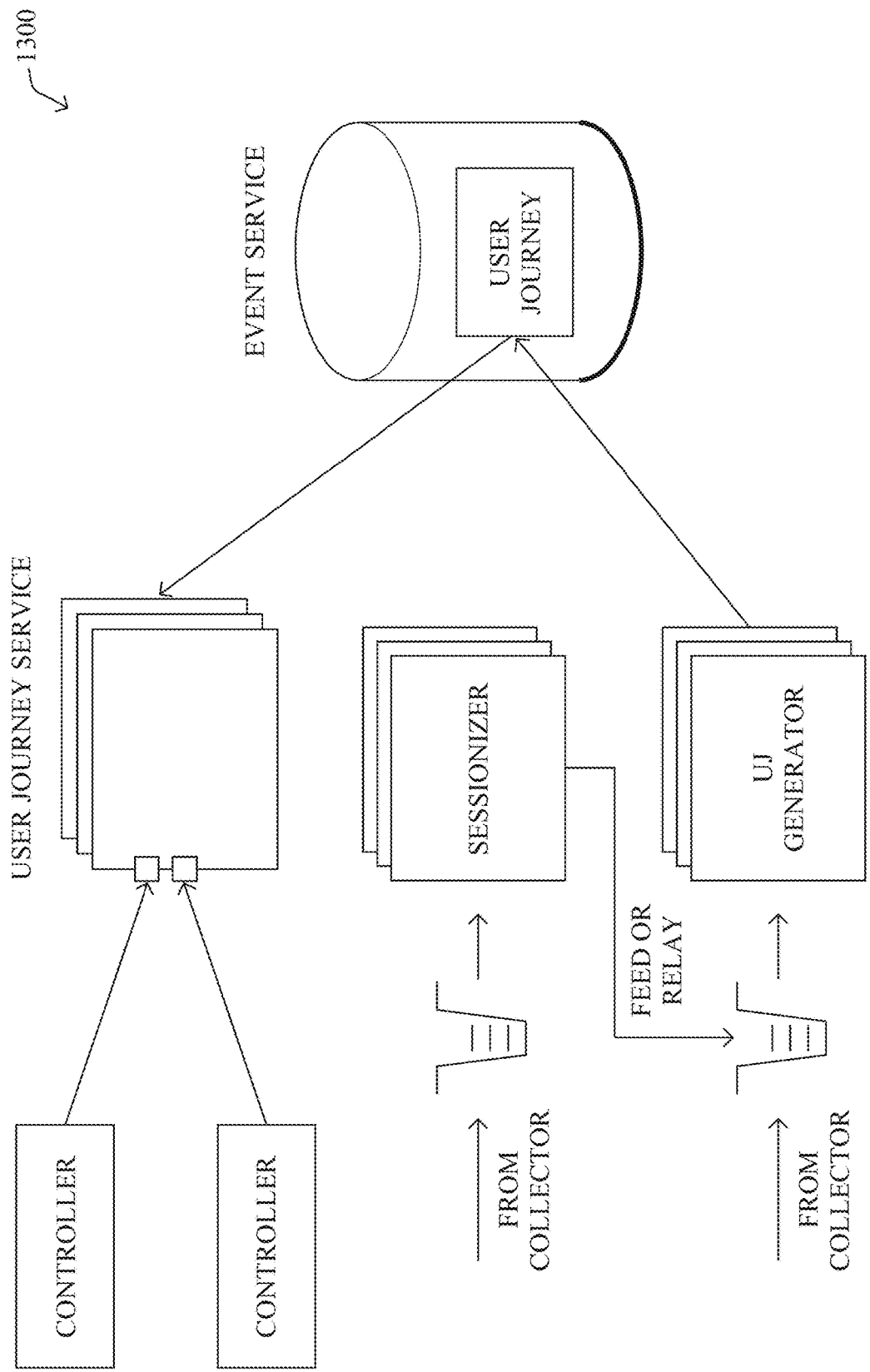
FIGS. 13A-13C illustrate example alternative architectures for user performance journey monitoring systems.
Figure 13B:
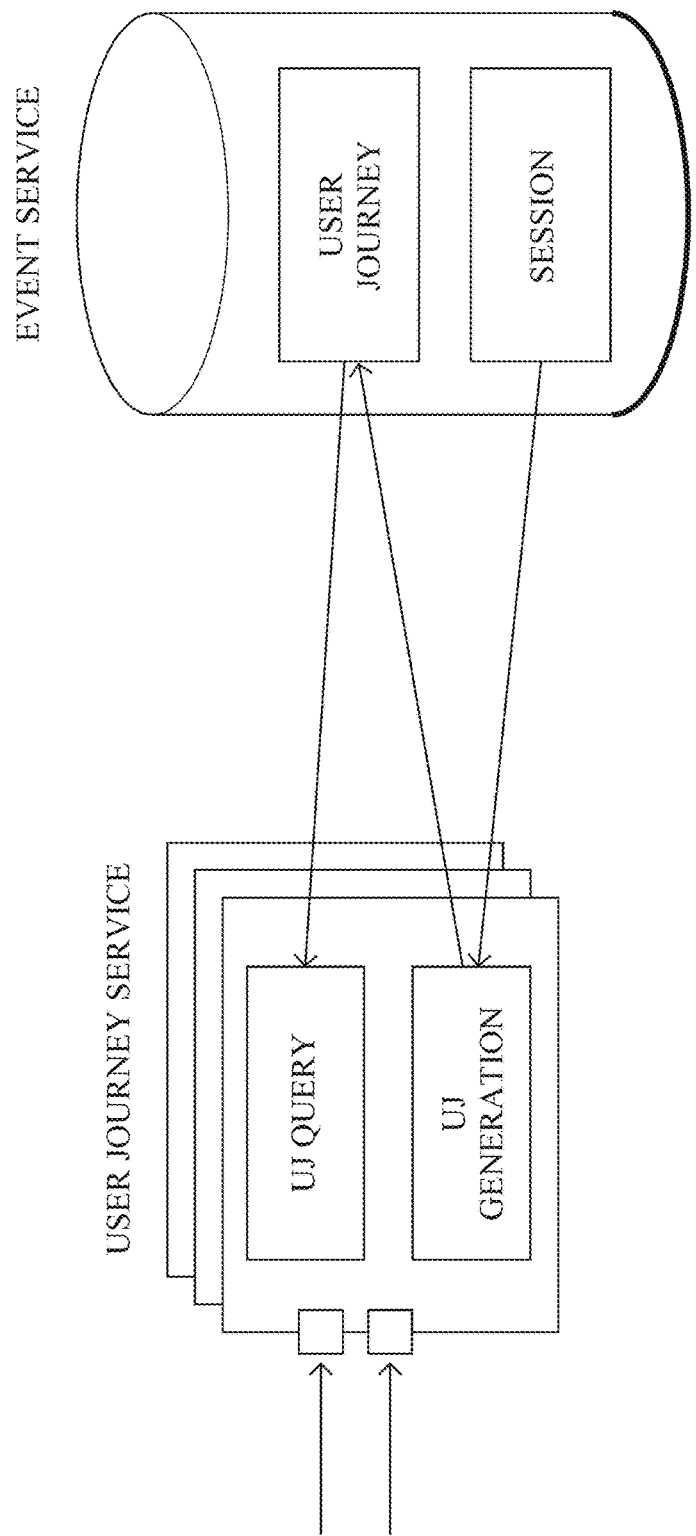
Figure 13C:
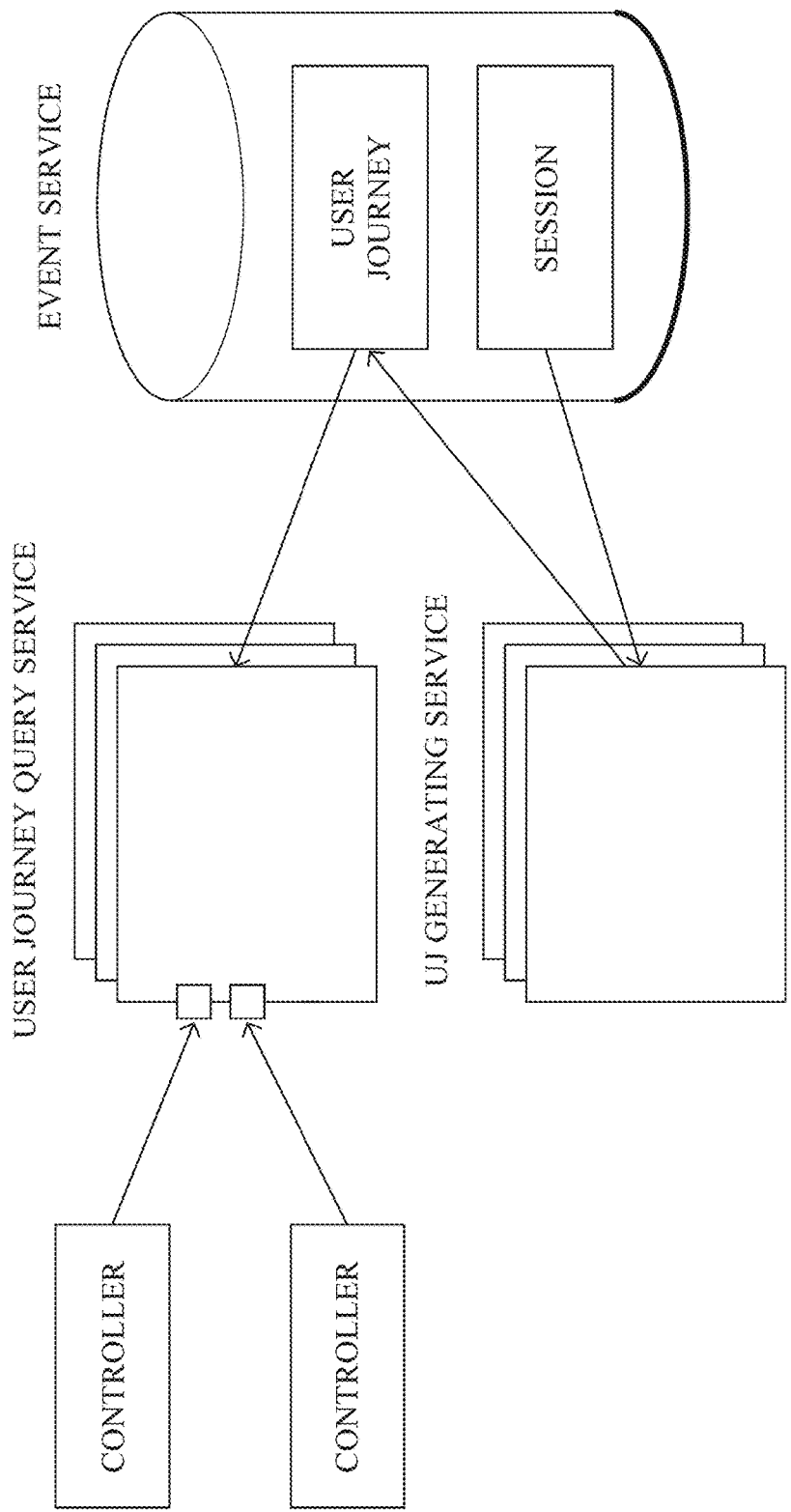

With reference to FIGS. 13A-13C, alternative user journey performance monitoring architectures are shown. Notably, FIG. 13A depicts an architecture 1300 that implements stream-based processing that is independent from a sessionizer. In this architecture, two services are created: user journey service and user journey generator service. The generator service will receive and process EUM events as they arrive, either from collectors directly or relayed through the sessionizer, and generate User Journey data. This new generator service works independently from the sessionizer, thus it might need to receive a session state information from sessionizer.

FIG. 13B depicts a query-based architecture 1302 using a single service. This solution would have minimal impact on existing end user monitoring services. In addition, FIG. 13C depicts a query-based architecture using two services. One service generates user journey data by querying a search engine that has access to an intermedia data structure that stores the user journey data for session records, the other service serves querying from controller and/or customer for user journey based on certain criteria (app version, connect type, carrier, browser version, geo, time range, etc.). This solution would also have minimal impact on existing end user monitoring services.

Figure 14:
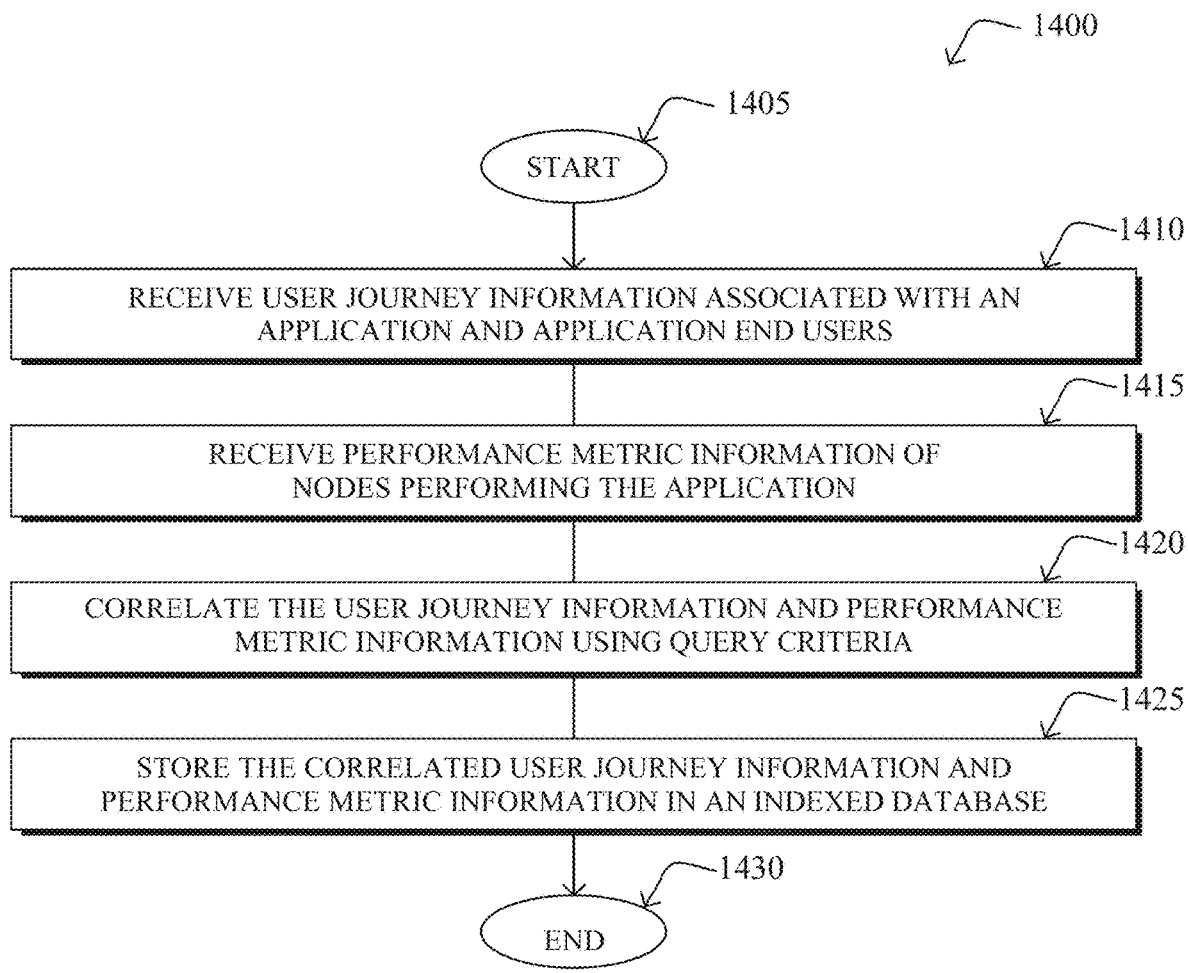
FIG. 14 illustrates an example procedure for user performance journey monitoring.

In closing, FIG. 14 illustrates an example simplified procedure for user performance journey monitoring in accordance with one or more embodiments described herein, particularly from the perspective of, for example, a user journey query service. For example, a non-generic, specifically configured device (e.g., device 200, particularly a monitoring device) may perform procedure 1400 by executing stored instructions (e.g., process 248, such as a user journey monitoring process). The procedure 1400 may start at step 1405, and continues to step 1410, where, as described in greater detail above, a process may receive user journey information associated with an application and application end users. In particular, the process may receive user journey information associated with an application and a plurality of application end users, the user journey information indicative of navigation paths of the application end users among a plurality of nodes configured to perform at least a part of the application. The application may be selected from the group consisting of a web application and a mobile application. The user journey information may indicative of information selected from the group consisting of a total number of the application end users that that have visited the plurality of nodes, a percentage of application end users that have visited each node in the plurality of nodes, and a median duration of how long the application end users visited a particular node of the plurality of nodes. The plurality of nodes may comprise a node selected from the group consisting of a particular webpage of a web application and a landing page of a mobile application.

At step 1415, the process may receive performance metric information of nodes performing the application. In particular, the process may receive performance metric information indicative of performance of the plurality of nodes configured to perform at least the part of the application. When the application is a web application, the performance metric information may be indicative of performance of the web application and is selected from the group consisting of a status of a page experience for a particular node of the plurality nodes, an end user response time for the particular node, and an error rate for the particular node. When the application is a mobile application, the performance metric information may be indicative of performance of the mobile application and is selected from the group consisting of a status of a network request for a particular node of the plurality nodes, an end user response time for the particular node, a crash rate for the particular node, an application not responding (ANR) rate for the particular node, and an error rate for the particular node.

At step 1420, the process may then correlate the user journey information and performance metric information using query criteria. In particular, the process may correlate the user journey information with the performance metric information based on one or more query criteria. When the application is a web application, the one or more query criteria may be selected from the group consisting of geolocation of a particular application end user device, a browser type of the particular application end user device, and browser version of the particular end user device. When the application is a mobile application, the one or more query criteria may be selected from the group consisting of geolocation of a particular application end user device, an application version of the particular application end user device, a device type of the particular end user device, a connection type of the particular end user device, and a carrier type of the particular end user device.

At step 1425, the process may store the correlated user journey information and performance metric information in an indexed database. In particular, the process may store the correlated user journey information and performance metric information in an application end user journey database indexed by the one or more query criteria, as described above with respect to an intermedia data structure.

The simplified procedure 1400 may then end in step 1430, notably with the ability to quickly and readily identify and aggregate user journeys. Other steps may also be included generally within procedure 1400. For example, such steps (or, more generally, such additions to steps already specifically illustrated above), may include: receiving, by the process, a request for application end user journey information, the request including at least one criterion of the one or more query criteria; and aggregating, by the process and in response to receiving the request, a plurality of entries in the application end user journey database using the at least one criterion as an index. The request for application end user journey information may further include a parameter selected from the group consisting of a parameter for user journey information of all of the plurality of application end users, a parameter for user journey information of a particular application end user of the plurality of application end users, a parameter for performance metric information of all of the plurality of nodes, and a parameter for performance metric information of a particular node of the plurality of nodes.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for "out of box" user performance journey monitoring. In particular, the techniques herein simultaneously identify end user journeys and performance issues at points in the journey. That is, the techniques herein allow operators of applications, by reviewing correlated end user journeys with performance metrics, to quickly and readily identify when a performance issue arises as well as where within the user journeys it occurs. Also, the techniques herein, by storing the correlated user journeys and performance metrics in a database that indexes that correlated information by various criteria/parameters (e.g., ad hoc filters like time range, geolocation, browser device type (for web), application version), allow operators to "slice and dice" the user journey information for end users on the whole or an individual end user in real-time. Notably, the correlated user journeys and performance metrics may be stored in an intermediate data structure that a) is extendable so as to handle future requirements of new data attributes and b) stores user journey information (e.g., impact metrics), performance metrics, and criteria (e.g., filter fields), all of which may be tailored to, for example, web applications or mobile applications.

Furthermore, the techniques herein may illustratively be provided to customers as an "out of the box" solution, meaning it can be configured as a feature or functionality of a product that works without any special installation or any per-customer configuration or modification. That is, the solution described herein is agnostic to the particular application being monitored, whether web or mobile, and can generate insightful data correlation in any customer system, accordingly.

In still further embodiments of the techniques herein, a business impact of the users' performance journeys can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the users' performance journeys with various business transactions in order to better understand the effect on the business transactions, accordingly.

Illustratively, the techniques described herein may be performed by hardware, software, and/or firmware, such as in accordance with the illustrative user journey monitoring process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.).

According to the embodiments herein, a method herein may specifically comprise: receiving, by a process, user journey information associated with an application and a plurality of application end users, the user journey information indicative of navigation paths of the application end users among a plurality of nodes configured to perform at least a part of the application; receiving, by the process, performance metric information indicative of performance of the plurality of nodes configured to perform at least the part of the application; correlating, by the process, the user journey information with the performance metric information based on one or more query criteria; and storing, by the process, the correlated user journey information and performance metric information in an application end user journey database indexed by the one or more query criteria In one embodiment, the method may further comprise: receiving, by the process, a request for application end user journey information, the request including at least one criterion of the one or more query criteria; and aggregating, by the process and in response to receiving the request, a plurality of entries in the application end user journey database using the at least one criterion as an index.

In one embodiment, the request for application end user journey information further includes a parameter selected from the group consisting of a parameter for user journey information of all of the plurality of application end users, a parameter for user journey information of a particular application end user of the plurality of application end users, a parameter for performance metric information of all of the plurality of nodes, and a parameter for performance metric information of a particular node of the plurality of nodes.

In one embodiment, the application is selected from the group consisting of a web application and a mobile application.

In one embodiment, the user journey information is further indicative of information selected from the group consisting of a total number of the application end users that that have visited the plurality of nodes, a percentage of application end users that have visited each node in the plurality of nodes, and a median duration of how long the application end users visited a particular node of the plurality of nodes.

In one embodiment, the plurality of nodes comprises a node selected from the group consisting of a particular webpage of a web application and a landing page of a mobile application.

In one embodiment, the application is a web application, further wherein the performance metric information indicative of performance of the web application and is selected from the group consisting of a status of a page experience for a particular node of the plurality nodes, an end user response time for the particular node, and an error rate for the particular node.

In one embodiment, the application is a mobile application, further wherein the performance metric information is indicative of performance of the mobile application and is selected from the group consisting of a status of a network request for a particular node of the plurality nodes, an end user response time for the particular node, a crash rate for the particular node, an application not responding (ANR) rate for the particular node, and an error rate for the particular node.

In one embodiment, the application is a web application, further wherein the one or more query criteria are selected from the group consisting of geolocation of a particular application end user device, a browser type of the particular application end user device, and browser version of the particular end user device.

In one embodiment, the application is a mobile application, further wherein the one or more query criteria are selected from the group consisting of geolocation of a particular application end user device, an application version of the particular application end user device, a device type of the particular end user device, a connection type of the particular end user device, and a carrier type of the particular end user device.

According to the embodiments herein an apparatus herein may specifically comprise: one or more network interfaces to communicate with a network; a processor coupled to the network interfaces and configured to execute one or more processes; and a memory configured to store a process executable by the processor, the process, when executed, configured to: receive user journey information associated with an application and a plurality of application end users, the user journey information indicative of navigation paths of the application end users among a plurality of nodes configured to perform at least a part of the application; receive performance metric information indicative of performance of the plurality of nodes configured to perform at least the part of the application; correlate the user journey information with the performance metric information based on one or more query criteria; and store the correlated user journey information and performance metric information in an application end user journey database indexed by the one or more query criteria.

Further, according to the embodiments herein, a tangible, non-transitory, computer-readable medium herein may have computer-executable instructions stored thereon that, when executed by a processor on a computer, may cause the computer to perform a method specifically comprising: receiving user journey information associated with an application and a plurality of application end users, the user journey information indicative of navigation paths of the application end users among a plurality of nodes configured to perform at least a part of the application; receiving performance metric information indicative of performance of the plurality of nodes configured to perform at least the part of the application; correlating the user journey information with the performance metric information based on one or more query criteria; and storing the correlated user journey information and performance metric information in an application end user journey database indexed by the one or more query criteria.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   receiving, by a process, user journey information associated with an application and a plurality of application end users, the user journey information indicative of navigation paths of the application end users among a plurality of nodes configured to perform at least a part of the application, wherein the plurality of nodes comprises a node that is one of either a particular webpage of a web application or a landing page of a mobile application, and wherein the user journey information is further indicative of a number or percentage of the application end users that have visited the particular webpage or the landing page;
   receiving, by the process, performance metric information indicative of performance of the plurality of nodes configured to perform at least the part of the application;
   correlating, by the process, the user journey information with the performance metric information based on one or more query criteria;
   storing, by the process, the correlated user journey information and performance metric information in an application end user journey database indexed by the one or more query criteria; and
   providing, by the process, a user interface configured to display statistics regarding the user journey information comprising the number or percentage of the application end users that have visited the particular webpage or the landing page and one or more of application versions, device types, connection types, carrier types, or regions of the application end users.

2. The method as in claim 1, wherein the application is one of either a web application or a mobile application.

3. The method as in claim 1, wherein the application is a web application, and wherein the performance metric information indicative of performance of the web application and is selected from a group consisting of: a status of a page experience for a particular node of the plurality nodes, an end user response time for the particular node, and an error rate for the particular node.

4. The method as in claim 1, wherein the application is a mobile application, and wherein the performance metric information is indicative of performance of the mobile application and is selected from a group consisting of: a status of a network request for a particular node of the plurality nodes, an end user response time for the particular node, a crash rate for the particular node, an application not responding (ANR) rate for the particular node, and an error rate for the particular node.

5. The method as in claim 1, wherein the application is a web application, and wherein the one or more query criteria are selected from a group consisting of: geolocation of a particular application end user device, a browser type of the particular application end user device, and browser version of the particular end user device.

6. The method as in claim 1, wherein the application is a mobile application, and wherein the one or more query criteria are selected from a group consisting of: geolocation of a particular application end user device, an application version of the particular application end user device, a device type of the particular end user device, a connection type of the particular end user device, and a carrier type of the particular end user device.

7. An apparatus, comprising:
   one or more network interfaces to communicate with a network;
   a processor coupled to the network interfaces and configured to execute one or more processes; and
   a memory configured to store a process executable by the processor, the process, when executed, configured to:
      receive user journey information associated with an application and a plurality of application end users, the user journey information indicative of navigation paths of the application end users among a plurality of nodes configured to perform at least a part of the application, wherein the plurality of nodes comprises a node that is one of either a particular webpage of a web application or a landing page of a mobile application, and wherein the user journey information is further indicative of a number or percentage of the application end users that have visited the particular webpage or the landing page;

receive performance metric information indicative of performance of the plurality of nodes configured to perform at least the part of the application;

correlate the user journey information with the performance metric information based on one or more query criteria;

store the correlated user journey information and performance metric information in an application end user journey database indexed by the one or more query criteria; and provide a user interface configured to display statistics regarding the user journey information comprising the number or percentage of the application end users that have visited the particular webpage or the landing page and one or more of application versions, device types, connection types, carrier types, or regions of the application end users.

8. The apparatus as in claim 7, wherein the application is a web application, and wherein the performance metric information indicative of performance of the web application and is selected from a group consisting of: a status of a page experience for a particular node of the plurality nodes, an end user response time for the particular node, and an error rate for the particular node.

9. The apparatus as in claim 7, wherein the application is a mobile application, and wherein the performance metric information is indicative of performance of the mobile application and is selected from a group consisting of: a status of a network request for a particular node of the plurality nodes, an end user response time for the particular node, a crash rate for the particular node, an application not responding (ANR) rate for the particular node, and an error rate for the particular node.

10. The apparatus as in claim 7, wherein the application is a web application, and wherein the one or more query criteria are selected from a group consisting of: geolocation of a particular application end user device, a browser type of the particular application end user device, and browser version of the particular end user device.

11. The apparatus as in claim 7, wherein the application is a mobile application, and wherein the one or more query criteria are selected from a group consisting of: geolocation of a particular application end user device, an application version of the particular application end user device, a device type of the particular end user device, a connection type of the particular end user device, and a carrier type of the particular end user device.

12. A tangible, non-transitory, computer-readable medium having computer-executable instructions stored thereon that, when executed by a processor on a computer, cause the computer to perform a method comprising:

receiving user journey information associated with an application and a plurality of application end users, the user journey information indicative of navigation paths of the application end users among a plurality of nodes configured to perform at least a part of the application, wherein the plurality of nodes comprises a node that is one of either a particular webpage of a web application or a landing page of a mobile application, and wherein the user journey information is further indicative of a number or percentage of the application end users that have visited the particular webpage or the landing page;

receiving performance metric information indicative of performance of the plurality of nodes configured to perform at least the part of the application;

correlating the user journey information with the performance metric information based on one or more query criteria;

storing the correlated user journey information and performance metric information in an application end user journey database indexed by the one or more query criteria; and providing a user interface configured to display statistics regarding the user journey information comprising the number or percentage of the application end users that have visited the particular webpage or the landing page and one or more of application versions, device types, connection types, carrier types, or regions of the application end users.

* * * * *

UNITED STATES PATENT AND TRADEMARK OFFICE
CERTIFICATE OF CORRECTION

| | | |
|---|---|---|
| PATENT NO. | : 12,047,839 B2 | Page 1 of 1 |
| APPLICATION NO. | : 16/745648 | |
| DATED | : July 23, 2024 | |
| INVENTOR(S) | : Xiaochun Mei et al. | |

It is certified that error appears in the above-identified patent and that said Letters Patent is hereby corrected as shown below:

In the Specification

Column 22, Line 2 please amend as shown:
for example, a specific time range, geolocation, etc. The Signed and Sealed this
Twenty-fourth Day of June, 2025

Coke Morgan Stewart
*Acting Director of the United States Patent and Trademark Office*